US012632800B2

(12) United States Patent
Gulea et al.

(10) Patent No.: US 12,632,800 B2
(45) Date of Patent: May 19, 2026

(54) UNDER-SERVED QUERY IDENTIFICATION SYSTEM

(71) Applicant: Airbnb, Inc., San Francisco, CA (US)

(72) Inventors: Toma Gulea, San Francisco, CA (US); Bradley Christopher Turnbull, Frisco, TX (US)

(73) Assignee: Airbnb, Inc., San Francisco, CA (US)

( * ) Notice: Subject to any disclaimer, the term of this patent is extended or adjusted under 35 U.S.C. 154(b) by 64 days.

(21) Appl. No.: 18/753,175

(22) Filed: Jun. 25, 2024

(65) Prior Publication Data

US 2025/0029018 A1      Jan. 23, 2025

Related U.S. Application Data

(60) Provisional application No. 63/528,267, filed on Jul. 21, 2023.

(51) Int. Cl.
| | |
|---|---|
| *G06Q 10/02* | (2012.01) |
| *G06F 16/9535* | (2019.01) |
| *G06F 16/9538* | (2019.01) |
| *G06N 5/022* | (2023.01) |

(52) U.S. Cl.
CPC ......... *G06Q 10/02* (2013.01); *G06F 16/9535* (2019.01); *G06F 16/9538* (2019.01); *G06N 5/022* (2013.01)

(58) Field of Classification Search
None
See application file for complete search history.

(56) References Cited

U.S. PATENT DOCUMENTS

2009/0234710 A1 *   9/2009   Belgaied Hassine ...................... G06Q 30/0201
705/7.29

OTHER PUBLICATIONS

"Hexagonal hierarchical geospatial indexing system", Uber Technologies, [Online]. Retrieved from the Internet: URL: https: h3geo. org , (2024), 2 pgs.
Amemiya, Yuki, "How do users revise zero-hit product search queries?", Advances in Information Retrieval: 43rd European Conference on IR Research, Proceedings, Part II 43. Springer, (2021), 185-182.
Cameron, A Colin, "", Regression Analysis of Count Data , 2nd Edition. 566 pgs, Cambridge University Press, (2012), 8 pgs.

(Continued)

*Primary Examiner* — George Chen

(74) *Attorney, Agent, or Firm* — Schwegman Lundberg & Woessner, P.A.

(57)          ABSTRACT

Systems and methods are provided to generate an actual number of search results, a total estimated number of search results based on historical search data in the online marketplace, and a conversion estimated number of search results for users who converted, for a given set of query parameters in an online marketplace. The systems and methods generates a low inventory state metrics based on determining a first probability of getting the actual number of search results plus one given the conversion number of search results, a second probability of getting the actual number of results given the total estimated number of search results, a third probability of getting the actual number of search results given the conversion number of search results and a fourth probability of getting the actual number of search results plus one given the total estimated number of search results

20 Claims, 21 Drawing Sheets

1200

(56)     References Cited

OTHER PUBLICATIONS

Deng, Alex, "Variance reduction using in-experiment data: efficient and targeted online measurement for sparse and delayed outcomes", Proceedings of the 29th ACM SIGKDD Conference on Knowledge Discovery and Data Mining, (2023), 10 pgs.

Garrido, Melissa, "Methods for Constructing and Assessing Propensity Scores", Health Services Research, 49(5), (Oct. 2014), 1701-1720.

Goswami, Anjan, "Quantifying and Visualizing the Demand and Supply Gap from E-commerce Search Data using Topic Models", Companion Proceedings of The World Wide Web Conference, (2019), 348-353.

Hastie, Trevor, "Chapter 9: Additive models, trees, and related methods", The Elements of Statistical Learning: Data Mining, Inference, and Prediction, Second Edition, Springer, New York, NY, (2009), 295-336.

Neuberg, Leland, "Causality: models, reasoning, and inference by Judea Pearl", Econometric Theory, 19. Cambridge University Press, (2003), 675-685.

Pearl, Judea, "Causal diagrams for empirical research", Biometrika, 82, 4, (1995), 669-710.

Shpitser, Ilya, "Dormant independence", Proceeding of the Twenty-Third AAAI Conference on Artificial Intelligence, (2008), 1081-1087.

Singh, Gyanit, "Rewriting Null E-Commerce Queries to Recommend Products", Proceedings of the 21st International Conference on World Wide Web. Association for Computing Machinery, (2012), 73-82.

Tan, Zehong, "Query rewrite for null and low search results in ecommerce", SIGIR, (2017), 5 pgs.

Tian, Jin, "On the testable implications of causal models with hidden variables", arXiv: 1301.0608 [cs.AI]. Report No. UAI-P-2002, (2012), 519-527.

Turnbull, Bradley, "Learning Intent to Book Metrics for Airbnb Search", World Wide Web Conference. Association for Computing Machinery, (2019), 3265-3271.

Varga, Anita, "Dealing with confounding in observational studies: a scoping review of methods evaluated in simulation studies with single-point exposure", Statistics in Medicine, 42, 4, (2023), 487-516.

Zhang, Mengxiao, "Advancing query rewriting in e-commerce via shopping intent learning", IGIR Workshop on eCommerce, [Online]. Retrieved from the Internet: URL: https: www.amazon.science publications advancing-query-rewriting-in-e-commerce-via-shopping-intent-learning, (2022), 9 pgs.

* cited by examiner

500

Unidentified Model with Latent Variable

Unidentified Model with Latent Variable 2

800

900

1000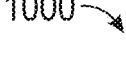
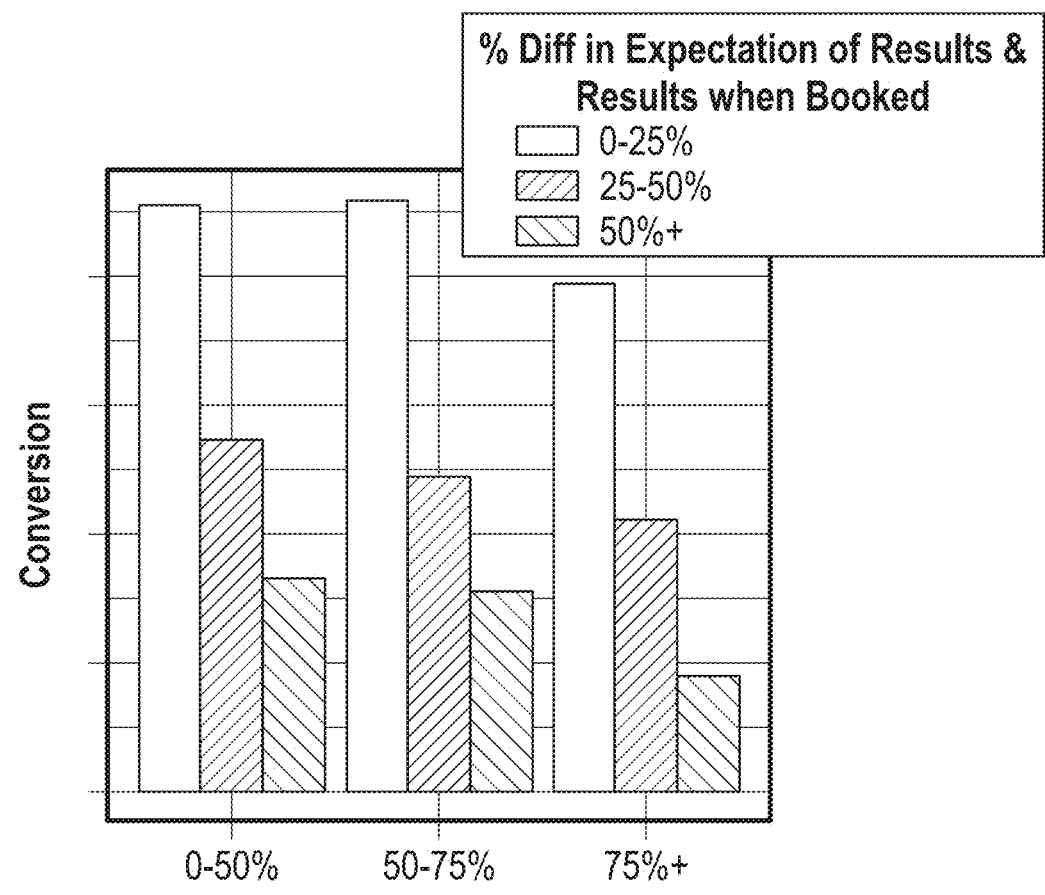
*FIG. 10*

1100

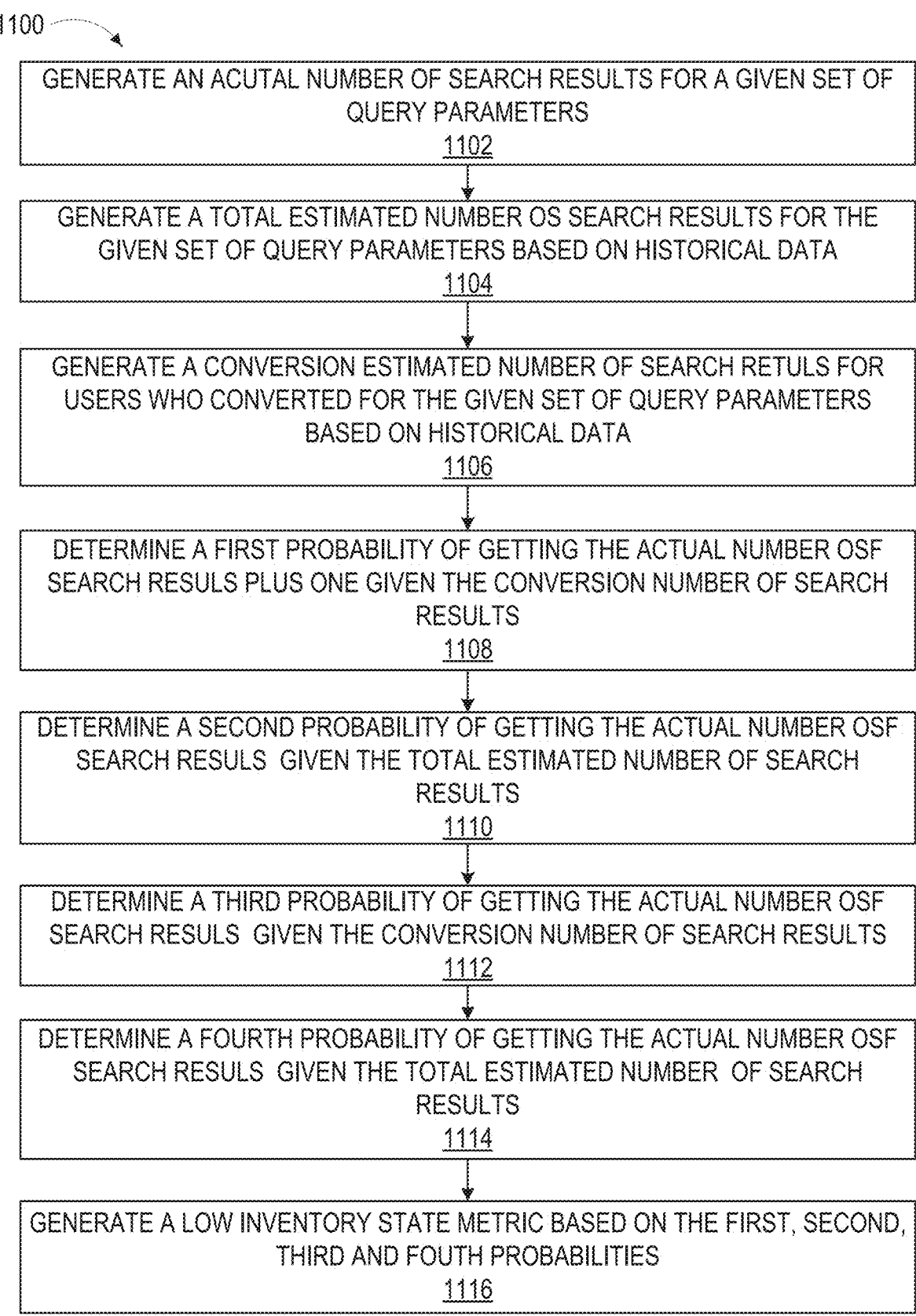

GENERATE AN ACUTAL NUMBER OF SEARCH RESULTS FOR A GIVEN SET OF QUERY PARAMETERS
1102

GENERATE A TOTAL ESTIMATED NUMBER OS SEARCH RESULTS FOR THE GIVEN SET OF QUERY PARAMETERS BASED ON HISTORICAL DATA
1104

GENERATE A CONVERSION ESTIMATED NUMBER OF SEARCH RETULS FOR USERS WHO CONVERTED FOR THE GIVEN SET OF QUERY PARAMETERS BASED ON HISTORICAL DATA
1106

DETERMINE A FIRST PROBABILITY OF GETTING THE ACTUAL NUMBER OSF SEARCH RESULS PLUS ONE GIVEN THE CONVERSION NUMBER OF SEARCH RESULTS
1108

DETERMINE A SECOND PROBABILITY OF GETTING THE ACTUAL NUMBER OSF SEARCH RESULS GIVEN THE TOTAL ESTIMATED NUMBER OF SEARCH RESULTS
1110

DETERMINE A THIRD PROBABILITY OF GETTING THE ACTUAL NUMBER OSF SEARCH RESULS GIVEN THE CONVERSION NUMBER OF SEARCH RESULTS
1112

DETERMINE A FOURTH PROBABILITY OF GETTING THE ACTUAL NUMBER OSF SEARCH RESULS GIVEN THE TOTAL ESTIMATED NUMBER OF SEARCH RESULTS
1114

GENERATE A LOW INVENTORY STATE METRIC BASED ON THE FIRST, SECOND, THIRD AND FOUTH PROBABILITIES
1116

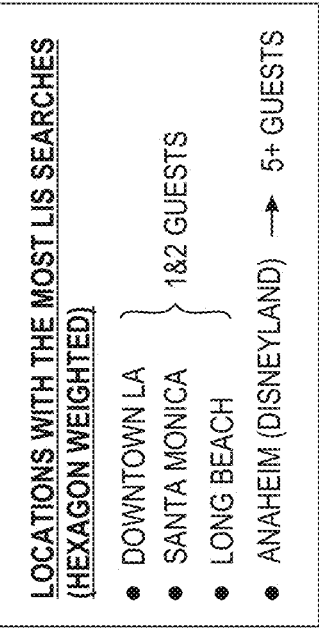
LOCATIONS WITH THE MOST LIS SEARCHES
(HEXAGON WEIGHTED)
- DOWNTOWN LA
- SANTA MONICA } 1&2 GUESTS
- LONG BEACH
- ANAHEIM (DISNEYLAND) → 5+ GUESTS
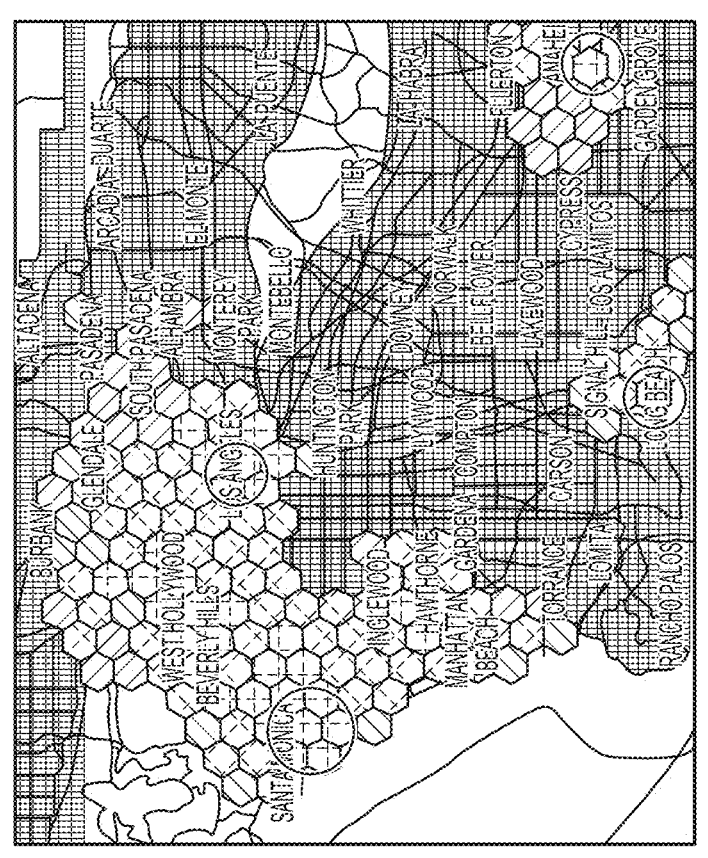
1500
*FIG. 15*

1700

1800

2000

UNDER-SERVED QUERY IDENTIFICATION SYSTEM

PRIORITY

This application claims the benefit of priority to U.S. Provisional Patent Application Ser. No. 63/528,267, filed Jul. 21, 2023, which is incorporated by reference herein in its entirety.

BACKGROUND

An online marketplace may provide a number of services, such as accommodations, tours, transportation and the like, and allow users to reserve or "book" one or more services. For example, a first user (e.g., host) can list one or more services on the online marketplace and a second user (e.g., guest) can request to view listings of services for a particular location (e.g., San Francisco) that may include a listing for the first user's service.

BRIEF DESCRIPTION OF THE DRAWINGS

Various ones of the appended drawings merely illustrate example embodiments of the present disclosure and should not be considered as limiting its scope.

FIG. 10 illustrates conversion versus expectations and outcome, according to some examples.

FIG. 11 is a flow chart illustrating aspects of a method, according to some examples.

FIG. 15 is a graphic depicting the specific areas (hexagons) within the Los Angeles market where users are facing a lack of supply, according to some examples.

DETAILED DESCRIPTION

Systems and methods described herein relate to an under-served query identification system. An online marketplace offers users the opportunity to book unique as well as more traditional accommodations. Users primarily explore the available inventory for their trip by executing searches and leveraging a variety of filters to express their preferences. Sometimes a user will encounter very few results returned for their search which can lead to a poor user experience and eventual abandonment of the platform. From a user experience and business perspective, it is therefore valuable to identify such search queries that yield insufficient inventory and lead to missed conversion opportunities. The longevity and complexity of user search sessions in an online marketplace, however, pose an additional technical challenge to this problem, as a user's intent and persistence confounds the ability to understand the connection between the number of search results returned and a user's ultimate booking outcome. Example embodiments overcome at least this technical hurdle by employing a causal inference approach paired with predictive modeling. Example embodiments comprise an under-served query identification system with a causal framework and methodology to identify searches where an insufficient number of results returned is preventing booking conversion. The ability of the under-served query identification system to identify these searches has applications across analytical insights, experiment analyses, real-time product interventions and supply management. The efficacy of the approach is demonstrated via simulated data experiments and real user search queries.

To address the technical challenges, systems and methods are provided to generate an actual number of search results for a given set of query parameters in an online marketplace, generate a total estimated number of search results for the given set of query parameters based on historical search data in the online marketplace and generate a conversion estimated number of search results for users who converted for the given set of query parameters. The systems and methods determine a first probability of getting the actual number of search results plus one given the conversion estimated number of search results, determine a second probability of getting the actual number of search results given the total estimated number of search results, determine a third probability of getting the actual number of search results given the conversion estimated number of search results and determine a fourth probability of getting the actual number of search results plus one given the total estimated number of search results. The systems and methods generate a low inventory state metric based on the first probability, second probability, third probability and fourth probability. Further details are provided below.

Figure 1:
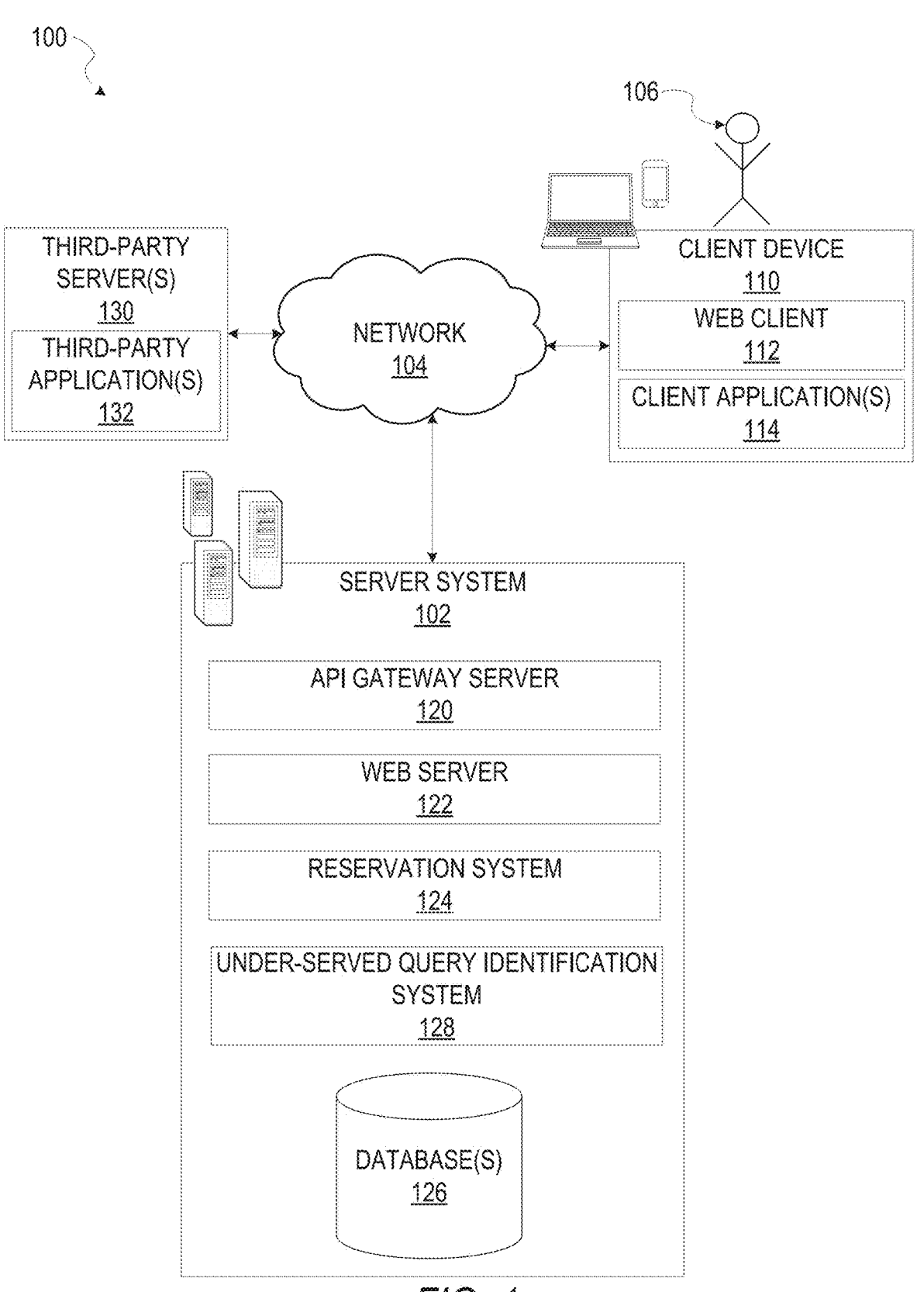
FIG. 1 is a block diagram illustrating a networked system, according to some examples.

FIG. 1 is a block diagram illustrating a networked system 100, according to some example embodiments. The networked system 100 includes one or more computing devices such as a client device 110. The client device 110 may comprise, but is not limited to a mobile phone, desktop computer, laptop, portable digital assistant (PDA), smart phone, tablet, ultrabook, netbook, laptop, multiprocessor system, microprocessor-based or programmable consumer electronic system, game console, set-top box, computer in a vehicle, wearable device (e.g., smart watch, smart glasses), or any other communication device that a user may utilize to access the networked system 100. In some examples, the client device 110 comprises a display module (not shown) to display information (e.g., in the form of user interfaces). In further example, the client device 110 comprises one or more of touch screens, accelerometers, gyroscopes, cameras, microphones, Global Positioning System (GPS) devices, and so forth. The client device 110 can be a device of a user that is used to request (search for) and receive reservation information, accommodation information, entry and access information for a reserved accommodation, set or update user preferences, and so forth, associated with travel. The client device 110 can also be a device of a user that is used to post and maintain a listing for a service, request and receive reservation information and guest information, generate entry and access information (e.g., access codes), set or update user preferences, and so forth.

One or more users 106 may be a person (e.g., guest, host, service personnel, customer support agent), a machine, or other means of interacting with the client device 110. In example embodiments, the user 106 may not be part of the networked system 100 but may interact with the networked system 100 via the client device 110 or other means. For instance, the user 106 can provide input (e.g., voice input, touch screen input, alphanumeric input) to the client device 110 and the input may be communicated to other entities in the networked system 100 (e.g., third-party servers 130, a server system 102) via a network 104. In this instance, the other entities in the networked system 100, in response to receiving the input from the user 106, communicate information to the client device 110 via the network 104 to be presented to the user 106. In this way, the user 106 can interact with the various entities in the networked system 100 using the client device 110.

The networked system 100 further includes a network 104. One or more portions of the network 104 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the internet, a portion of the public switched telephone network (PSTN), a cellular telephone network, a wireless network, a Wi-Fi network, a WiMAX network, another type of network, or a combination of two or more such networks. One or more portions of the network 104 can comprise short-range wireless communication, such as Bluetooth, WiFi, near field communication (NFC), ultraband, Zigbee, or other form of short-range wireless communication.

The client device 110 can access the various data and applications provided by other entities in the networked system 100 via a web client 112 (e.g., a browser, such as the Internet Explorer® browser developed by Microsoft® Corporation of Redmond, Washington) or one or more client applications 114. The client device 110 can include one or more client applications 114 (also referred to as "apps") such as, but not limited to, a web browser, a messaging application, an electronic mail (email) application, an ecommerce site application, a mapping or location application, a reservation application, an entry or keypad access application, a customer support application, and the like.

In some embodiments, one or more client applications 114 are included in a given one of the client devices 110 and configured to locally provide the user interface and at least some of the functionalities, with the client application 114 configured to communicate with other entities in the networked system 100 (e.g., third-party servers 130, the server system 102), on an as-needed basis, for data and/or processing capabilities not locally available (e.g., to access reservation or listing information, request data, authenticate a user 106, verify a method of payment, receive an access code). Conversely, one or more client applications 114 may not be included in the client device 110, and then the client device 110 can use its web browser to access the one or more applications hosted on other entities in the networked system 100 (e.g., third-party servers 130, the server system 102).

The networked system 100 can further include one or more third-party servers 130. The one or more third-party servers 130 can include one or more third-party application(s) 132. The one or more third-party application(s) 132, executing on the third-party server(s) 130, interact with the server system 102 via a programmatic interface provided by an application programming interface (API) gateway server 120. For example, one or more of the third-party applications 132 request and utilize information from the server system 102 via the API gateway server 120 to support one or more features or functions on a website hosted by a third party or an application hosted by the third party. The third-party website or application 132, for example, provides various functionality that is supported by relevant functionality and data in the server system 102, such as entry and access information for an accommodation. The third-party servers 130 can be a cloud computing environment, according to some example embodiments. The third-party servers 130, and any servers associated with the third-party servers 130, can be associated with a cloud-based application, in one example embodiment.

The server system 102 provides server-side functionality via the network 104 (e.g., the internet or a WAN) to one or more third-party servers 130 and/or one or more client devices 110 and/or one or more accommodation devices 140. The server system 102 is a cloud computing environment, according to some example embodiments. The server system 102, and any servers associated with the server system 102, are associated with a cloud-based application, in one example embodiment.

In one example, the server system 102 provides server-side functionality for an online marketplace. The online marketplace provides various listings for trip items, such as accommodations hosted by various managers (also referred to as "owners" or "hosts") that can be reserved by clients (also referred to as "users" or "guests"), such as an apartment, a house, a cabin, one or more rooms in an apartment or house, and the like. As explained above, the online marketplace can further provide listings for other trip items, such as experiences (e.g., local tours), car rentals, flights, public transportation, and other transportation or activities related to travel.

The server system 102 can include the API gateway server 120, a web server 122, a reservation system 124 and an under-served query identification system 128 that may be communicatively coupled with one or more databases 126 or other forms of data store.

The one or more databases 126 comprises one or more storage devices that store data related to the reservation system 124, the under-served query identification system 128, and other systems or data. The one or more databases 126 can further store information related to third-party servers 130, third-party applications 132, client devices 110, client applications 114, users 106, accommodation devices 140, and so forth. The one or more databases 126 are implemented using any suitable database management system such as MySQL, PostgreSQL, Microsoft SQL Server, Oracle, SAP, IBM DB2, or the like. The one or more databases 126 include cloud-based storage in some examples.

The reservation system 124 manages resources and provides back-end support for third-party servers 130, third-party applications 132, client applications 114, and so forth, which may include cloud-based applications. The reservation system 124 provides functionality for viewing listings related to trip items (e.g., accommodation listings, activity listings), generating and posting a new listing, analyzing and ranking images to be posted in a new listing, managing listings, booking listings and other reservation functionality, and so forth, for an online marketplace. Further details related to the reservation system 124 are shown in FIG. 2.

Figure 2:
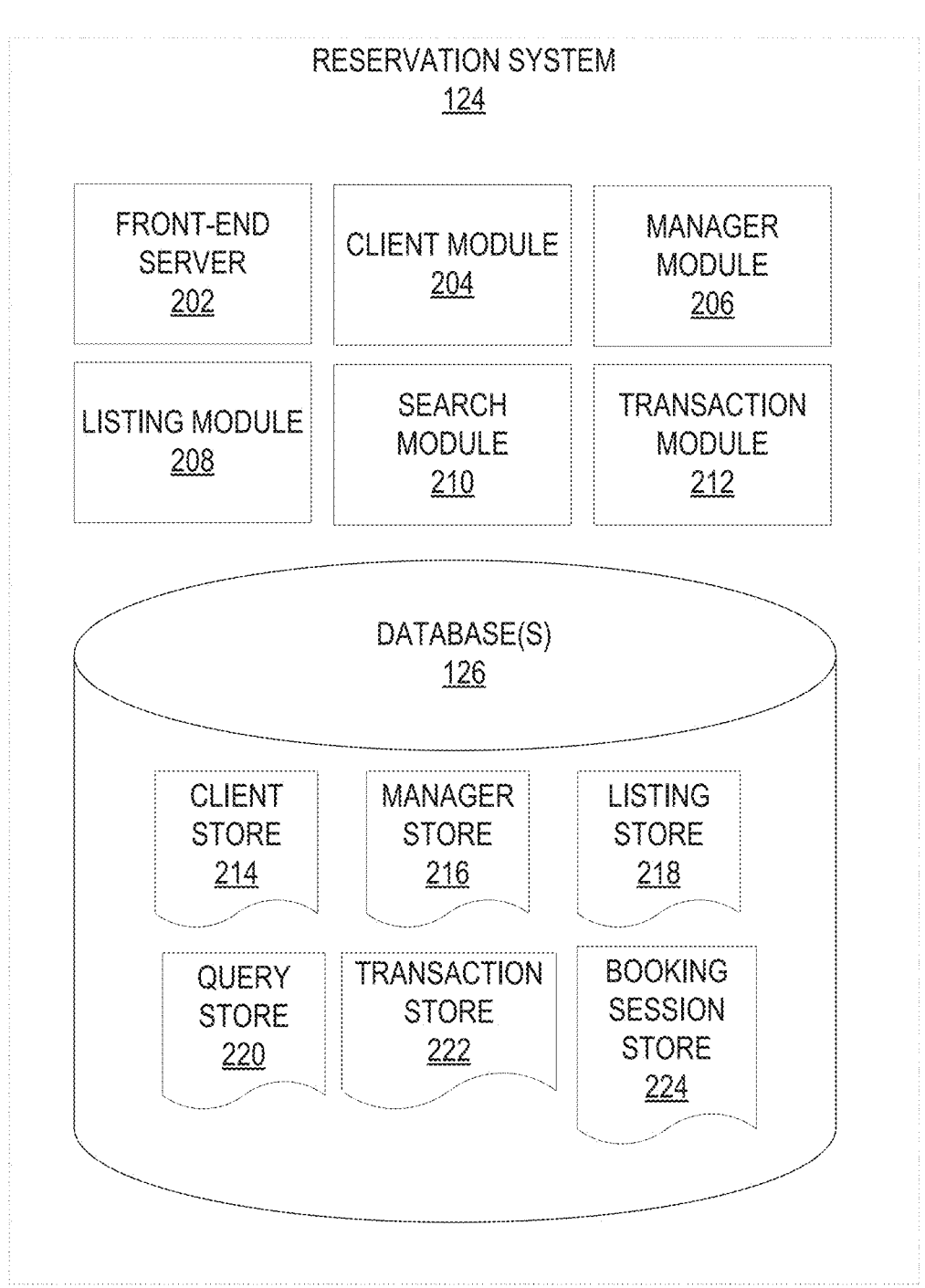
FIG. 2 is a block diagram illustrating a reservation system, according to some examples.

FIG. 2 is a block diagram illustrating a reservation system 124, according to some example embodiments. The reservation system 124 comprises a front-end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different and/or other modules that are not described herein.

The reservation system 124 can be implemented using a single computing device or a network of computing devices, including cloud-based computer implementations. The computing devices can be server-class computers including one or more high-performance computer processors and random access memory, which may run an operating system such as Linux or the like. The operations of the reservation system 124 is controlled either through hardware or through computer programs installed in nontransitory computer-readable storage devices such as solid-state devices or magnetic storage devices and executed by the processors to perform the functions described herein.

The front-end server 202 includes program code that allows client devices 110 to communicate with the reservation system 124. The front-end server 202 can utilize the API gateway server 120 and/or the web server 122 shown in FIG. 1. The front-end server 202 can include a web server hosting one or more websites accessible via a hypertext transfer protocol (HTTP), such that user agents, such as a web browser software application, may be installed on the client devices 110 and can send commands to and receive data from the reservation system 124. The front-end server 202 can also utilize the API gateway server 120 that allows software applications installed on client devices 110 and third-party servers 130 and applications 132 to call to the API to send commands to and receive data from the reservation system 124. The front-end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124 and executes processing logic for client-related information that may be requested by other components of the reservation system 124. Each client is represented in the reservation system 124 by an individual client object having a unique client identifier (ID) and client profile, both of which are stored in the client store 214.

The client profile includes a number of client-related attribute fields that may include a profile picture and/or other identifying information, a geographical location, a client calendar, an access code, smart device (e.g., accommodation device 140) preferences (e.g., user preferences), and so forth. The client's geographical location is either the client's current location (e.g., based on information provided by the client device 110) or the client's manually entered home address, neighborhood, city, state, or country of residence. The client location may be used to filter search criteria for time-expiring inventory relevant to a particular client or to assign default language preferences.

The client module 204 provides code for clients to set up and modify the client profile. The reservation system 124 allows each client to exchange communications, request transactions, and perform transactions with one or more managers.

The manager module 206 comprises program code that provides a user interface that allows managers (also referred to herein as "users," "hosts" or "owners") to manage their interactions and listings with the reservation system 124 and executes processing logic for manager-related information that may be requested by other components of the reservation system 124. Each manager is represented in the reservation system 124 by an individual manager object having a unique manager ID and manager profile, both of which are stored in the manager store 216.

The manager profile is associated with one or more listings owned or managed by the manager and includes a number of manager attributes including transaction requests and a set of listing calendars for each of the listings managed by the manager.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 comprises program code for managers to list trip items, such as time-expiring inventory, for booking by clients. The listing module 208 is configured to receive the listing from a manager describing the inventory being offered; a timeframe of its availability including one or more of the start date, end date, start time, and an end time; a price; a geographical location; images and descriptions that characterize the inventory; and any other relevant information. For example, for an accommodation reservation system, a listing may include a type of accommodation (e.g., house, apartment, room, sleeping space, or other), a representation of its size (e.g., square footage, number of rooms), the dates that the accommodation is available, and a price (e.g., per night, per week, per month). The listing module 208 allows a user 106 to include additional information about the inventory, such as videos, photographs, and other media, or such as accessibility and other information.

The geographical location associated with the listing identifies the complete address, neighborhood, city, and/or country of the offered listing. The listing module 208 is also capable of converting one type of location information (e.g., mailing address) into another type of location information (e.g., country, state, city, neighborhood) using externally available geographical map information.

The price of the listing is the amount of money a client needs to pay in order to complete a transaction for the inventory. The price may be specified as an amount of money per day, per week, per month, and/or per season, or per another interval of time specified by the manager. Additionally, the price may include additional charges such as cleaning fees, pet fees, service fees, and taxes, or the listing price may be listed separately from additional charges.

Each listing is represented in the reservation system 124 by a listing object, which includes the listing information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, a minimum or maximum number of people allowed for the inventory). Information from each listing calendar is stored in the listing store 218.

Figure 3:
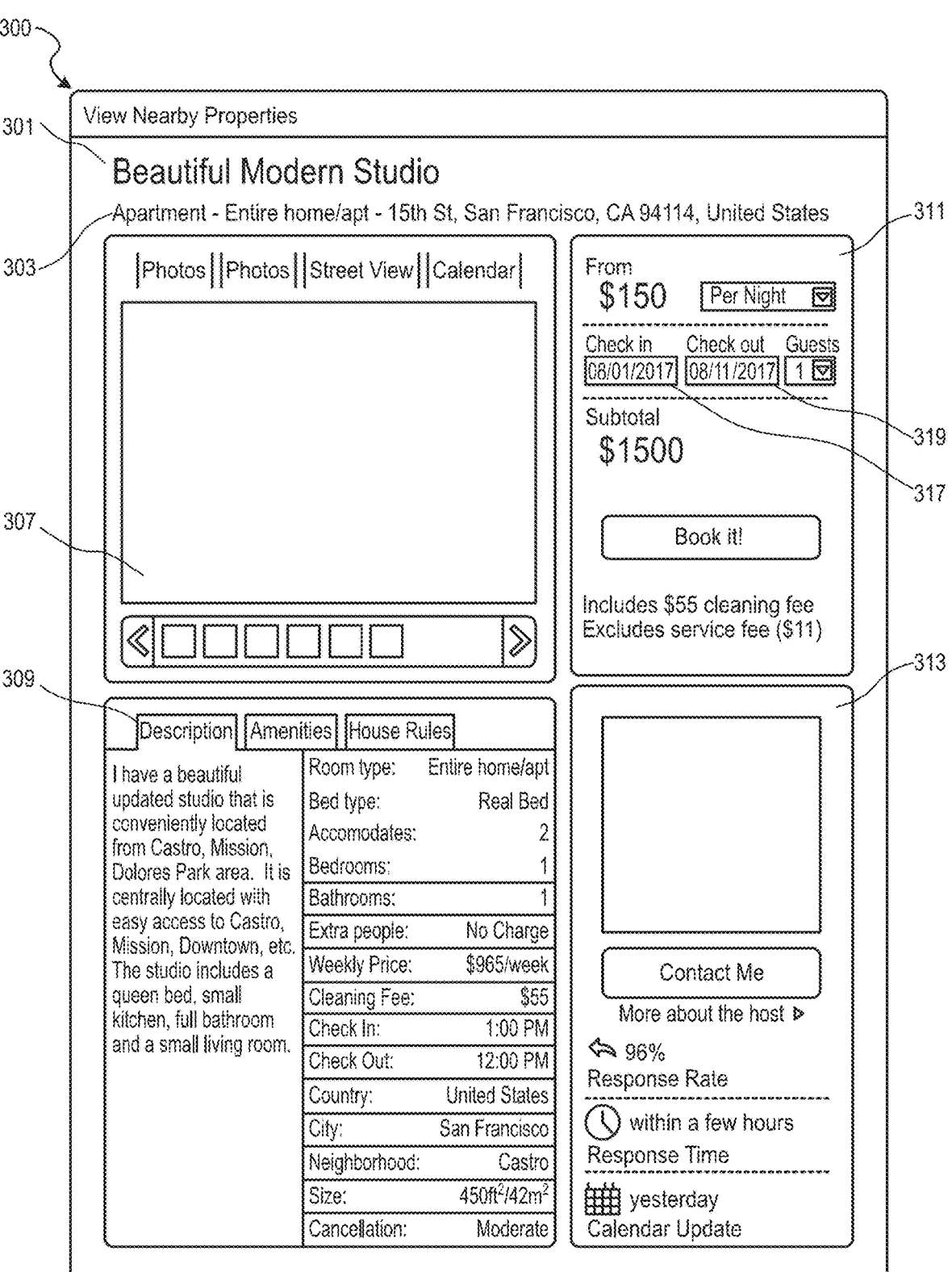
FIG. 3 illustrates an example user interface for a description of a listing for a trip item, according to some examples.

FIG. 3 illustrates an example user interface 300 for a description of a listing for a trip item (e.g., an apartment in San Francisco) in an online marketplace. The example listing shown in FIG. 3 is for accommodations in San Francisco. In other examples, the listing could be for a tour, local experience, transportation service, or other trip item. The listing may include a title 301 and a brief description 303 of the trip item. The listing may further include photos of the trip item, maps of the area or a location associated with the trip item, a street view of the trip item, a calendar for the trip item, and so forth, which may be viewed in area 307. The listing may include a detailed description 309, pricing information 311, and the listing host's information 313. The listing may further allow a user to select a date range for the trip item by entering or choosing specific check-in date 317 and check-out date 319.

Returning to FIG. 2, the search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from the search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as a formal request) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that agreeable terms are reached between the manager and the client. Modifications to a received request may include, for example, changing the date, price, or time/date range (and thus, effectively changing which time-expiring inventory is being transacted for). The standardized form may require the client to record the start time/date, duration (or end time), or any other details that must be included for an acceptance to be binding without further communication.

The transaction module 212 receives the filled-out form from the client and, in one example, presents the completed request form including the booking parameters to the manager associated with the listing. The manager may accept the request, reject the request, or provide a proposed alternative that modifies one or more of the parameters. If the manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other modules not specifically described herein allow the client to complete payment and the manager to receive payment.

The transaction module 212 may further comprise code configured to enable clients to instantly book a listing, whereby the online marketplace books or reserves the listing upon receipt of the filled-out form from the client.

The transaction store 222 stores requests made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as mentioned above.

The transaction module 212 may also provide managers and clients with the ability to exchange informal requests to transact. Informal requests are not sufficient to be binding upon the client or manager if accepted, and, in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Returning to FIG. 1, the server system 102 further includes an under-served query identification system 128. The under-served query identification system 128 manages resources and provides back-end support for third-party servers 130, third-party applications 132, client applications 114, accommodation device(s) 140, and so forth, which can include cloud-based applications. In one example, an online marketplace, such as Airbnb, is a two-sided rental marketplace where users can book both traditional and unique accommodations. A user, also referred to herein as a guest, looking for accommodation generally starts with a search query, such as specifying a location, dates, and guest count. As a user explores the available accommodation listings they may refine their search, applying filters to express specific preferences, such as price maximum or access to a pool. Once a user finds a listing that they like, they can checkout and book it.

Sometimes users encounter very few search results. This may be because they have applied a lot of filters to their search or because there are very few listings remaining for their dates. States of low inventory can be a frustrating experience for the user and can ultimately lead to the user abandoning the platform without making a booking. Therefore, an important part of building a great search experience for a user is being able to identify when a user is facing an insufficient amount of inventory which is causing a bad experience and a missed booking opportunity. As explained above, the longevity and complexity of user search sessions in an online marketplace, however, pose an additional technical challenge to this problem, as a user's intent and persistence confounds the ability to understand the connection between the number of search results returned and a user's ultimate booking outcome. Example embodiments overcome at least this technical hurdle by employing a causal inference approach paired with predictive modeling. Example embodiments comprise an under-served query identification system with a causal framework and methodology to identify searches where an insufficient number of results returned is preventing booking conversion. The ability of the under-served query identification system to identify these searches has applications across analytical insights, experiment analyses, real-time product interventions and supply management. The efficacy of the approach is demonstrated via simulated data experiments and real user search queries.

The literature on low search results generally focuses on methodologies for rewriting such queries (e.g., due to a mismatch between the user's vocabulary and the vocabulary of the inventory). The inventors were unable to find any studies addressing the determination of whether the number of results is "too low." Queries returning null search results are usually the candidates for rewriting. A singular static threshold can also be used (e.g., 20 results) but this approach has big limitations for online marketplaces, such as Airbnb, due to the diverse nature of queries of a user's searches. Moreover, for online marketplaces, such as Airbnb, the vast majority of user queries are for a low cardinality set of locations (e.g., major cities) with specific preferences expressed through a predefined set of filters. It is therefore very unlikely that a query returning few search results is from a mismatch of vocabulary, ambiguous terms, or rare tail queries as is the focus of current literature. The more common culprit for a low number of search results in such online marketplaces is a lack of inventory in a given location.

For instance, a last-minute search for accommodations in a popular coastal city may yield 30 results during the peak season (without any user filtering). On the other hand, a search for lodging in a specific neighborhood with a strict price preference may yield 10 results. The 30 results returned for the first broad search query is likely insufficient and may prevent the guest from booking, while the 10 results returned for the precise search are typical given the specificity of the search and be sufficient to result in a booking.

Example embodiments provide a novel methodology to identify searches where there is an insufficient number of results returned, preventing booking conversion. Example embodiments use a causal inference approach, as well as predictive modeling to tackle the technical problem. For instance, example embodiments make at least the following contributions: (1) a system describing the causal relationship between booking conversion and number of search results; (2) an approach to estimate the true effect of number of search results in the presence of latent variables; and (3) an application of combining predictive modeling and causal inference to understand user outcomes in search.

As mentioned above, one technical problem addressed by example embodiments herein is how to identify search queries for which the amount of inventory returned is preventing booking conversion. Such queries are referred to herein as a "Low Inventory State" (LIS).

Another way to define such state is a search for which an additional result would bring significant increase to the likelihood of booking conversion for the guest. This definition implies a binary outcome: a search is either a "LIS" or not, but this is only for practical purposes and simplicity of use for consumers of the metric. Further below is a discussion how such threshold is established to satisfy a binary output. The core of the problem is to determine the incremental effect of an additional result, for a given search query, on the probability of booking (conversion) which is represented here as equation (1):

$$BookIncr_{qry} = \frac{P(B = 1|R + 1)}{P(B = 1|R)} \qquad (1)$$

where B denotes if the search query eventually resulted in a booking for the user, B=1, and B=0 otherwise, and R denotes the number of results for the query (e.g., the amount of inventory).

Figure 4:
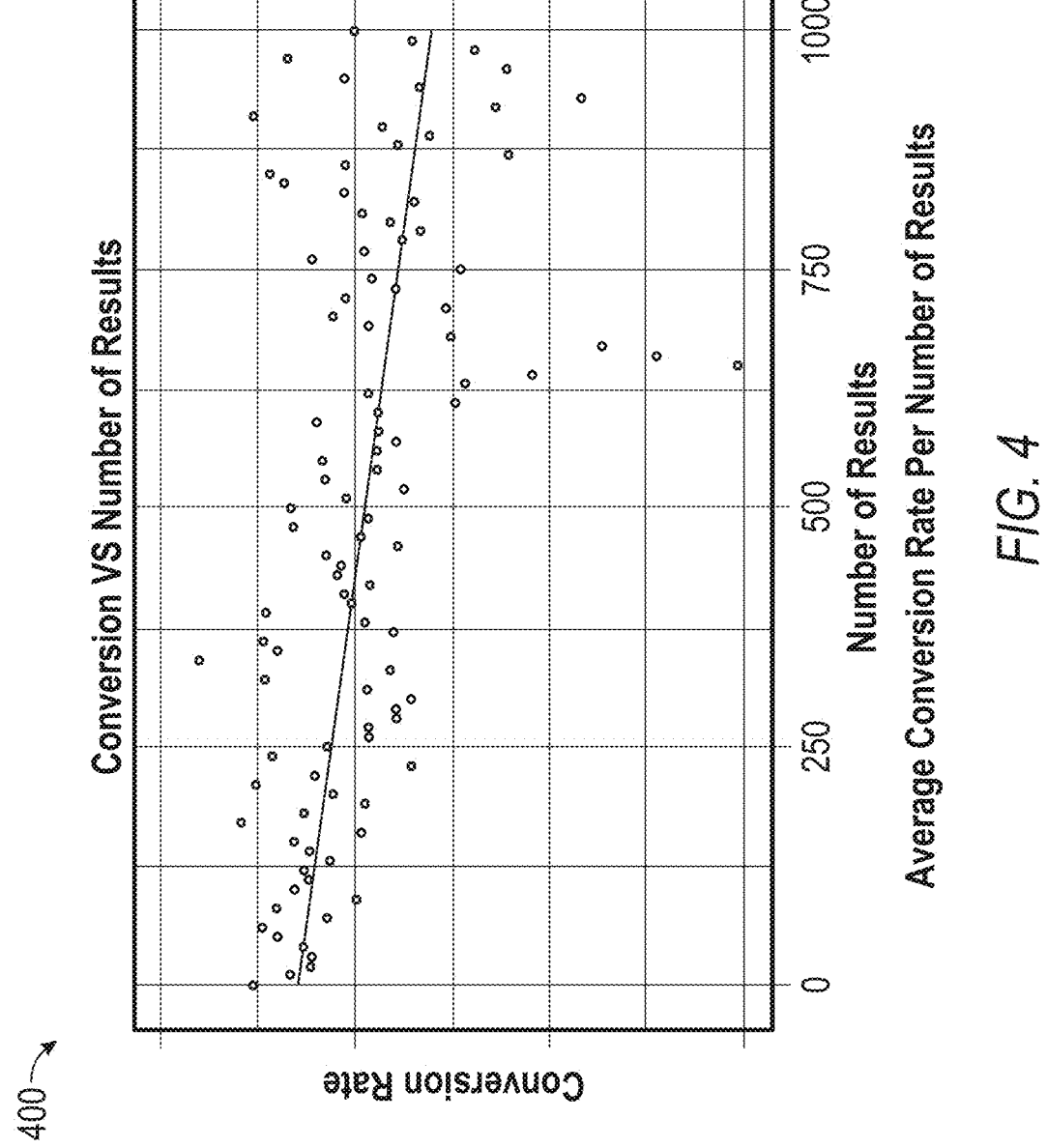
FIG. 4 depicts a relationship on a random sample of user queries showing an average conversion rate per number of results, according to some examples.
Figure 5:
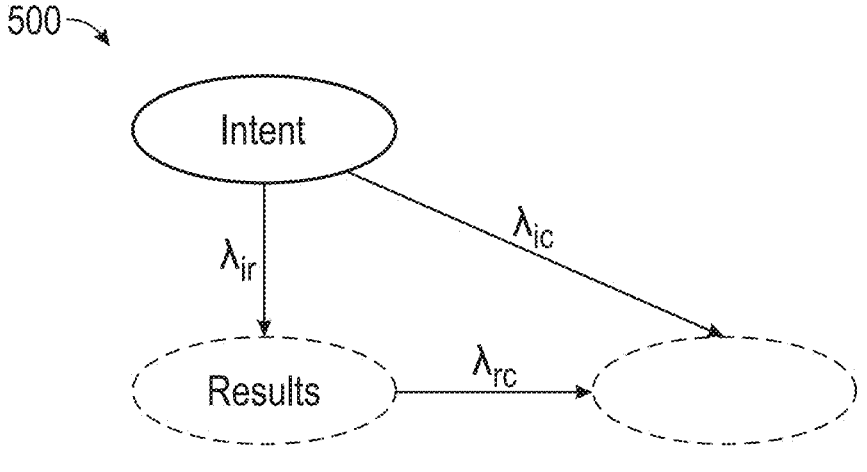
FIG. 5 is a graphic illustrating the problem where Intent is a latent (unobserved) variable, according to some examples.

Next is the issue of the hidden effect of the number of results on conversion. When drawing the relationship between number of results and conversion, a negative relationship is observed. FIG. 4 is a graphic 400 that depicts this relationship on a random sample of user queries showing an average conversion rate per number of results. As can be seen, the conversion rate decreases as the number of results increases. This is counter intuitive as one would expect that more inventory would lead to higher probability of conversion. What is actually observed is the effect of intent to book. Users on an online marketplace, such as Airbnb, can be in an early exploration phase or ready to make a booking for their next trip. This is referred to herein as the intent to book from a search query. The assumption is that users with high intent to book input more criteria and therefore limit the inventory returned. While a user can just be "exploring" with broad searches, a user with higher intent is generally more precise with location, budget and amenities. The result of this phenomenon is that a low inventory is indicative of a high intent and therefore correlates with conversion. In order to encode the assumptions made on the casual relationships, we use causal graphs to help us derive an identification of the impact of number of results on conversion. FIG. 5 is a graphic 500 that illustrates this problem where Intent is a latent (unobserved) variable.

Upon initial inspection, one possible way to approach the problem would be to model the likelihood of booking based on the number of results. For example, we could fit a logistic regression of B on the number of results. However, this approach would pose an identification issue, as the user's intent drives the number of search results down while positively influencing booking conversion. Such an approach would not allow to identify what would happen if we added more results to a query. Thus, we need to close the backdoor path of intent which is a challenging technical problem.

In FIG. 5, we are interested in identifying $\lambda_{rc}$ which is the causal effect of the number of results on conversion. If there is no Intent to book (I=0), the probability to book is null.

$$P(B = 1|I = 0) = 0$$

$$P(B = 1|R) = P(B = 1|R, I = 1) \times P(I = 1)$$

Therefore, equation (1) above can be written as equation (2) incorporating intent/as follows:

$$BookIncr_{qry} = \frac{P(B = 1|R + 1, I = 1)}{P(B = 1|R, I = 1)} \tag{2}$$

Figure 6:
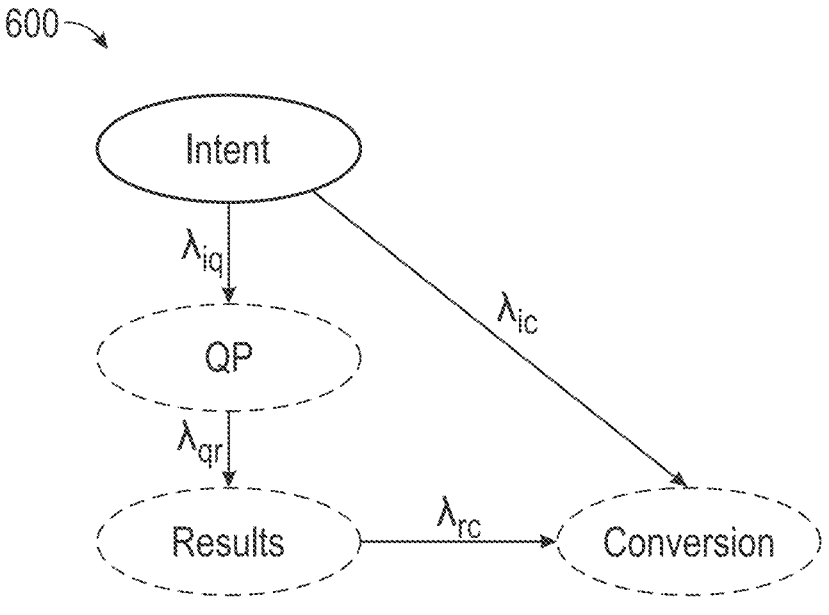
FIG. 6 illustrates the graphic of FIG. 5 with the addition of query parameters, according to some examples.

The mechanism by which Intent causes the number of results is indirect; it happens through the parameters of the query QP, such as map zoom, price filter, amenities requirements, and the like, as depicted in the graphic 600 of FIG. 6.

QP blocks the backdoor path of intent as the effect of Intent on number of results is unconfounded by the query parameters. QP is observable, we therefore condition conversion on the query parameters QP and rewrite equation (2) as follows:

$$BookIncr_{qry} = \frac{P(B = 1|R + 1, QP, I = 1)}{P(B = 1|R, QP, I = 1)} \tag{3}$$

Using Bayes theorem we obtain:

$$= \frac{P(R + 1|B = 1, QP, I = 1) \times P(R|QP, I = 1)}{P(R|B = 1, QP, I = 1) \times P(R + 1|QP, I = 1)} \tag{4}$$

For additional steps in obtaining the result, please refer to the Appendix A section below.

According to the causal relationships hypothesized in FIG. 6:

Intent⊥R|QP, and

Intent⊥R|(QP,B).

Therefore, we can rewrite the equation as follows:

$$BookIncr_{qry} = \frac{P(R + 1|B = 1, QP) \times P(R|QP)}{P(R|B = 1, QP) \times P(R + 1|QP)} \tag{5}$$

With this equation, we have closed the backdoor path of intent. As a result, computing the incremental impact of number of results only requires us to estimate the law behind P (R) and P (R|B=1):

P (R|QP): Number of results given the query parameters as features

P (R|B=1,QP): Number of results for users who made a booking given the query parameters The results count variable R can be assumed to follow a Poisson distribution, which is a reasonable choice for this type of variable. However, it is important to re-evaluate this assumption based on the specific dataset. Alternative approaches such as a Negative binomial regression or zero-inflated models can be considered as viable options. For examples discussed herein, we choose to estimate P (R|QP) and P (R|B=1,QP) using a Poisson regression, following the Poisson distribution assumption.

One might observe that the results shown herein bear a resemblance to a propensity score matching approach. To illustrate this point, consider comparing the conversion of queries with different numbers of results by matching them based on their expected number of results. In the appendix B section below, additional details are provided on how this solution can be framed using propensity score matching.

To compute the LIS metric, a first machine learning model is trained to estimate the number of results given the query parameters, a second machine learning model is trained to estimate the number of results for users who made a booking (converted) given the query parameters, and then the under-served query identification system 128 derives the incremental value of an additional search result for each query given the two estimations and actual number of results.

In some examples, the under-served query identification system 128 estimates the number of results returned by a search query using a Poisson regression, where the features are the query parameters denoted by QP. To account for potential non-linearities and interactions between the query parameters, a boosted regression tree (BRT) model is used in some examples, which combines multiple decision trees via an additive, gradient-boosting algorithm.

Specifically, we fit two BRT models using the number of results as the response variable and the query parameters QP as the input variables. The first machine learning model is trained on all searches and the second machine learning model is trained only on searches of users who made a subsequent booking (conversion). The resulting models allow the under-served query identification system 128 to estimate the expected number of search results, $\lambda$, and the expected number of results when a booking was made, $\lambda B=1$.

For illustrative purposes, a non-exhaustive list of features from QP includes a query string type (city, address, point of interest etc.), a map radius, filters used (e.g., price, amenity etc.), number of guests, number of bedrooms, number of nights, and so forth.

Next the under-served query identification system 128 derives the LIS metric from the model. Once the number of searches has been estimated, the incremental impact of an additional result on conversion, following equation (4), is derived as follows to generate the LIS metric:

$$IncrBook(\lambda_{B=1}, \lambda, R) = \frac{P(\lambda_{B=1}, \mu = R + 1) \times P(\lambda, \mu = R)}{P(\lambda_{B=1}, \mu = R) \times P(\lambda, \mu = R + 1)} \quad (6)$$

Where:
P (k, μ) denotes the probability mass function (PMF) of the Poisson distribution of paramter μ,
λ is the estimated number of results given QP,
λB=1 is the estimated number of results for bookers given QP,
R is the observed number of results for the search query.
The ratio value Incr($\lambda$B=1, $\lambda$, R) can be interpreted as the increase in likelihood of conversion for one additional result to the search query. For example, an estimation value of 1.1 implies that one additional result renders a 10% increase in conversion.

Figure 7:
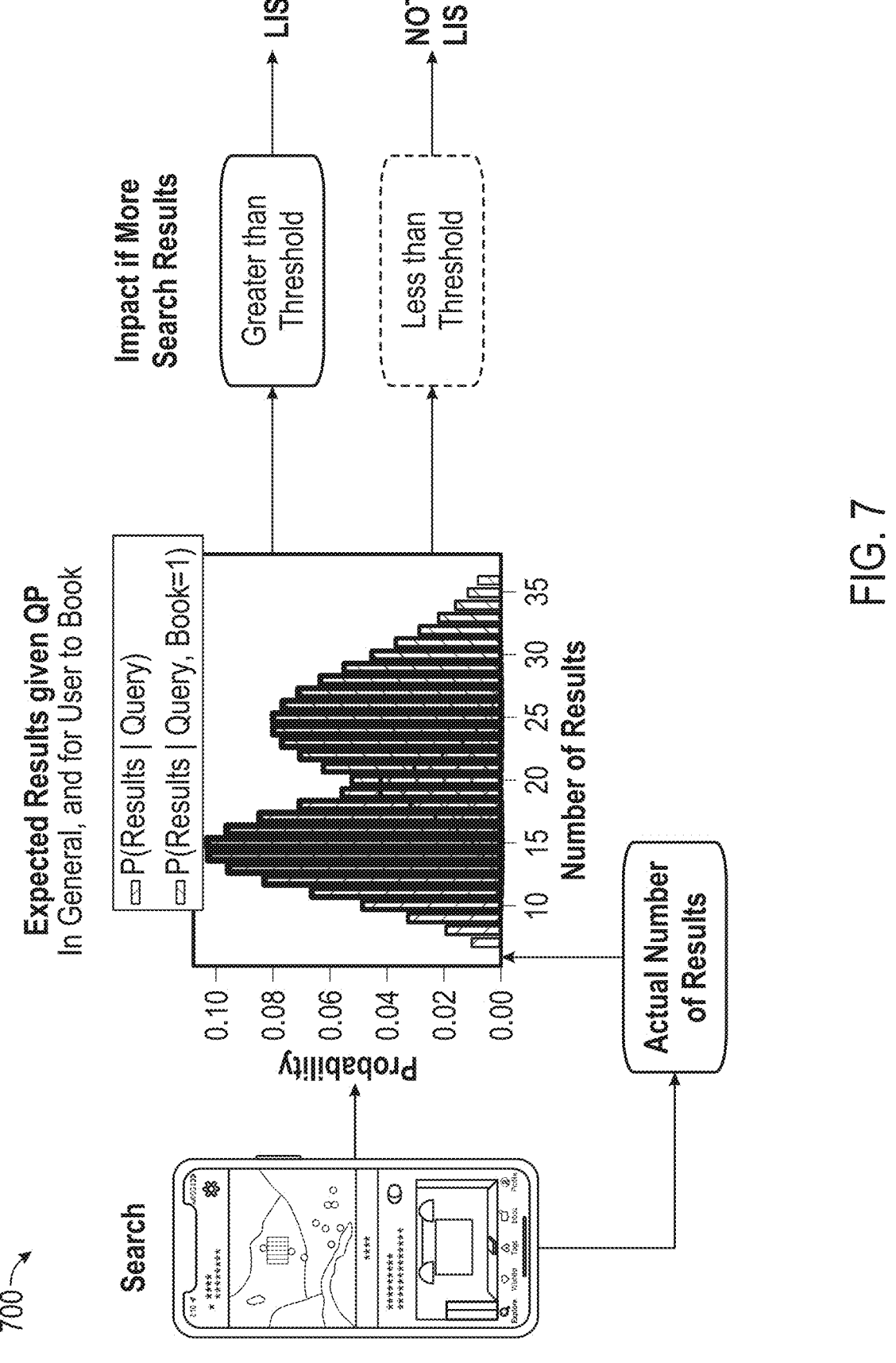
FIG. 7 provides a visual summary of the LIS identification approach, according to some examples.

In practice the ratio metric can be used directly as a continuous measure or bucketized (e.g., LIS searches and non-LIS searches). The bucketization can be done in various manners depending on the application. For the binary case, examples include:
setting a classification threshold based on share of searches classified as LIS or
identifying all searches with a specified gain in conversion or more from an additional result.
Python code to compute Incr($\lambda$B=1, $\lambda$, R) is illustrates in the Appendix C section below. FIG. 7 provides a visual summary 700 of the LIS identification approach.

A simulated data experiment was leveraged to assess the efficacy of the under-served query identification system 128, ensuring it accurately estimates the true effect which in practice cannot be directly observed due to the presence of hidden latent variable. The simulation process involves generating data based on causal relationships, including the user's intent to book, filtering usage, number of search results, and booking outcome.

The performance of the methodology described herein is benchmarked against a noncausal approach of directly modeling P(B|R,QP) and extracting the marginal impact of R on P(B), with QP serving as a control. More specifically we fit a logistic regression of B on R and QP. We refer to this comparative approach as "direct booking method" and the causal inference methodology presented as "LIS".

Figure 8:
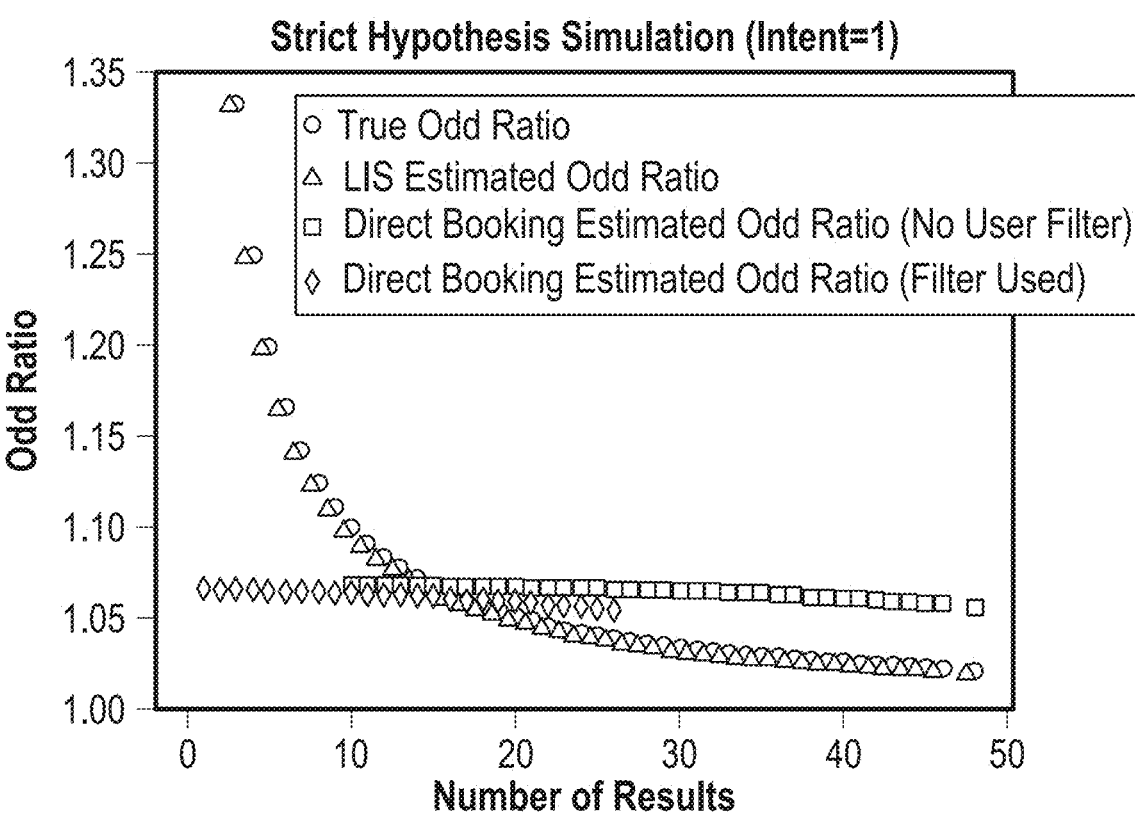
FIG. 8 illustrates results of a simulation, according to some examples.

Simulation (1) respects the strict assumption that results are drawn from a Poisson distribution and conversion is linearly derived from the number of results. We can observe in the graphic 800 of FIG. 8 that the estimation of the odd ratio produced by the "LIS" method (conditional on user intent) is exactly what is observed in the data. Conversely, the estimation from the "direct booking method" falls short, underestimating the decline in the odd ratio as the number of results increases.

The first simulation is presented to validate the approach described herein with favorable assumptions in the generation of data. We perform additional simulations with less favorable conditions. The details of the simulations and results are available in the Appendix C section below. In summary, the LIS method is able to capture the desired trends in conversion as well as the shape of the relationship between conversion and the number of results regardless of the assumptions of data generation. On the contrary, the "direct booking method" encounters an identification issue. Users with high intent tend to receive fewer results but still have a high probability of booking, while users with lower intent observe more results but have a lower likelihood of booking. This phenomenon is not properly captured by the non-causal "direct booking" method, resulting in a poor modeling of the expected relationship. Please refer to the Appendix C section below for the comprehensive analyses and detailed explanations.

Next is the assessment of the validity of LIS on online marketplace data, such as Airbnb data. When dealing with real user queries, we do not have access to any ground truth. We, therefore, cannot make any precise assessments of the model performance, but we can bring a body of evidence which shows that the model is useful for our main use case: identifying search queries for which user conversion suffers from a low amount of inventory.

Figure 9:
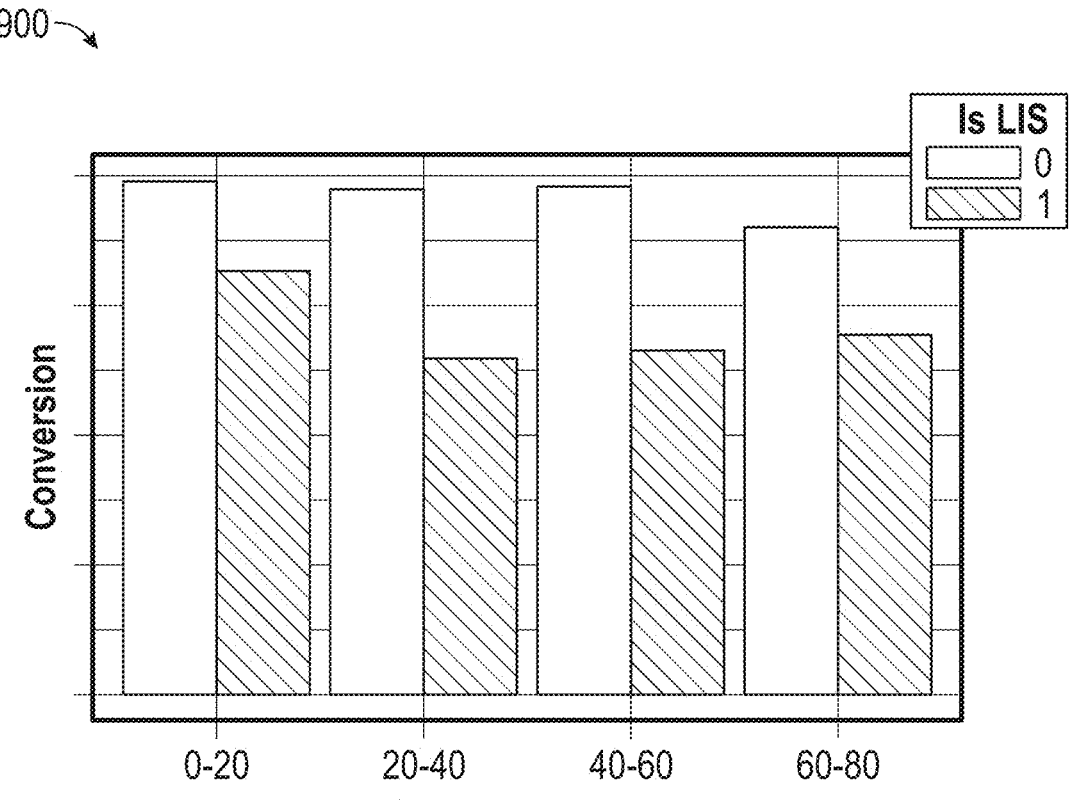
FIG. 9 illustrates the conversation rate for LIS and non-LIS identified searches varying across a number of search results, according to some examples.

Given a low number of results is correlated with intent and therefore conversion, we do not want to directly try to predict conversion using LIS. However, conditioning on a certain number of results, we can evaluate if LIS detects lower conversion. The graph 900 in FIG. 9 shows that within each bucket of number of results, low inventory state correlates with worse rate of conversion. FIG. 9 illustrates the conversation rate for LIS and non-LIS identified searches varying across a number of search results.

More directly, we assess the validity behind our causal inference methodology by analyzing the observable implications of our causal model. This can be achieved by comparing conversion rates across three key inputs into our LIS metric: (1) the expected number of results for a search, (2) the expected number of results for only bookers, and (3) the observed number of results. Note that the values for expected number of results are produced by our BRT Poisson model. Given the mechanics behind our causal formula we should expect the following trends:
The larger the positive difference between the expectation of the number of results for bookers and the observed number of results, the greater the incremental impact, and
the larger the positive difference between the expectation of the number of results for all searchers and the observed number of results, the greater the incremental impact.
The chart 1000 of FIG. 10 illustrates conversion versus expectations and outcome. We can see in FIG. 10 that the conversion rate is worse (e.g., more incremental impact) when the positive difference between the expectation of the numbers of results (all searches or bookers) and the number of observed results is large, therefore validating our causal inference methodology on real user data.

FIG. 11 is a flow chart illustrating aspects of a method 1100, according to some example embodiments. For illustrative purposes, the method 1100 is described with respect to the networked system 100 of FIG. 1. It is to be understood that the method 1100 may be practiced with other system configurations in other embodiments.

In operation 1102, a computing system (e.g., server system 102, reservation system 124, or under-served query identification system 128) generates an actual number of search results (R) for a given set of query parameters in an online marketplace. For example, a user inputs a set of query parameters into a user interface displayed on a computing device (e.g., client device 110). As one example, the user inputs query parameters such as a date and a geographical location for an accommodation. The computing system receives the given set of query parameters and executes a search with the given set of query parameters to generate search results for the given set of query parameters. For instance, the computing system generates a list of one or more accommodations in the geographical location. The computing system stores the given set of query parameters and the actual number of search results, in some examples.

In one example, a different computing system executes the search with the set of query parameters to generate the search results. For example, the server system 102, third-party server 130 or reservation system 124 executes the search using the given set of query parameters and generates the search results. The under-server query identification system 128 then receives and/or stores the actual number of those generated search results.

In operation 1104, the computing system generates a total estimated number of search results ($\lambda$) for the given set of query parameters based on historical search data in the online marketplace. In one example, the computing system trains a machine learning model, using the historical search data for a specified time period, to analyze the historical search data in the online marketplace to generate a total estimated number of search results for a given set of query parameters, as explained above. The total estimated number of search results for the given set of query parameters based on historical search data in the online marketplace is generated by the trained machine learning model. For instance, the given set of query parameters is input to the machine learning model that then the machine learning model analyzes the given set of query parameters to generate the estimated number of search results for the given set of query parameters.

In another example, the total estimated number of search results for the given set of query parameters based on historical search data in the online marketplace is generated based on an average of historical search results for the given set of query parameters. This can be done by the computing system using empirical averages or other method.

In operation 1106, the computing system generates a conversion estimated number of search results ($\lambda_{B=1}$) for users who converted (e.g., booked) for the given set of query parameters based on the historical search data in the online marketplace. In one example, the computing system trains a machine learning model, using a subset of the historical search data in a specified time period that resulted in a user conversion in an area searched, to analyze the historical search data in the online marketplace for users who converted to generate a conversion estimated number of search results for users who converted for a given set of query parameters. The conversion estimated number of search results for users who converted for the given set of query parameters is generated by the machine learning model. For instance, the given set of query parameters is input to the machine learning model and then the machine learning model analyzes the given set of query parameters to generate the conversion number of search results for the given set of query parameters.

In another example, the conversion number of search results for the given set of query parameters based on historical search data in the online marketplace is generated based on an average of historical search results for the given set of query parameters that resulted in conversion. This can be done by the computing system using empirical averages or other method.

In operation 1108, the computing system determines a first probability of getting the actual number of search results plus one (search result) given the conversion number of search results ($P(\lambda_{B=1}, \mu=R+1)$). In one example, the computing system determines the first probability based on the probability mass function (PMF) of the Poisson distribution, as explained above.

In operation 1110, the computing system determines a second probability of getting the actual number of results given the total estimated number of search results ($P(\lambda, \mu=R)$). In one example, the computing system determines the second probability based on the probability mass function (PMF) of the Poisson distribution, as explained above.

In operation 1112, the computing system determines a third probability of getting the actual number of search results given the conversion number of search results ($P(\lambda_{B=1}, \mu=R)$). In one example, the computing system determines the third probability based on the probability mass function (PMF) of the Poisson distribution, as explained above.

In operation 1114, the computing system determines a fourth probability of getting the actual number of search results plus one given the total estimated number of search results ($P(\lambda, \mu=R+1)$). In one example, the computing system determines the fourth probability based on the probability mass function (PMF) of the Poisson distribution, as explained above.

In operation 1116, the computing system generates a low inventory state metric based on the first probability, second probability, third probability and fourth probability. For example, the computing system multiplies the first probability by the second probability to generate a first value, multiplies the third probability by the fourth probability to generate a second value and generates the low inventory state metric by dividing the first value by the second value, as described above with respect to equation (6). The low inventory state metric is a value indicating an increase in probability of conversion if the actual number of search results includes one more search result. For example, the low inventory state metric can be a value between 0 and 1. An inventory state metric with a value of 0.1 would indicate a 10% higher chance of booking, an inventory state metric with a value of 0.3 would indicate a 30% higher chance of booking, and so forth.

As explained above, there are a number of ways the low inventory state metric can be utilized. In one example, the computing system determines whether the low inventory state metric exceeds a predefined threshold. For example, the low inventory state metric can be a number between 0 and 1 and an example threshold can be 0.1, 0.3, 0.7 or the like, depending on the application. In response to determining that the low inventory state metric exceeds the predefined threshold, the computing system causes at least one alternative option not included in a list of options in the search results to be displayed on a display of a computing device. The one alternative option can be based on a change to at least one query parameter of given set of query parameters (e.g., date or geographic location). For example, the alternative option may be based on a similar date or nearby geographic location.

Figure 12:
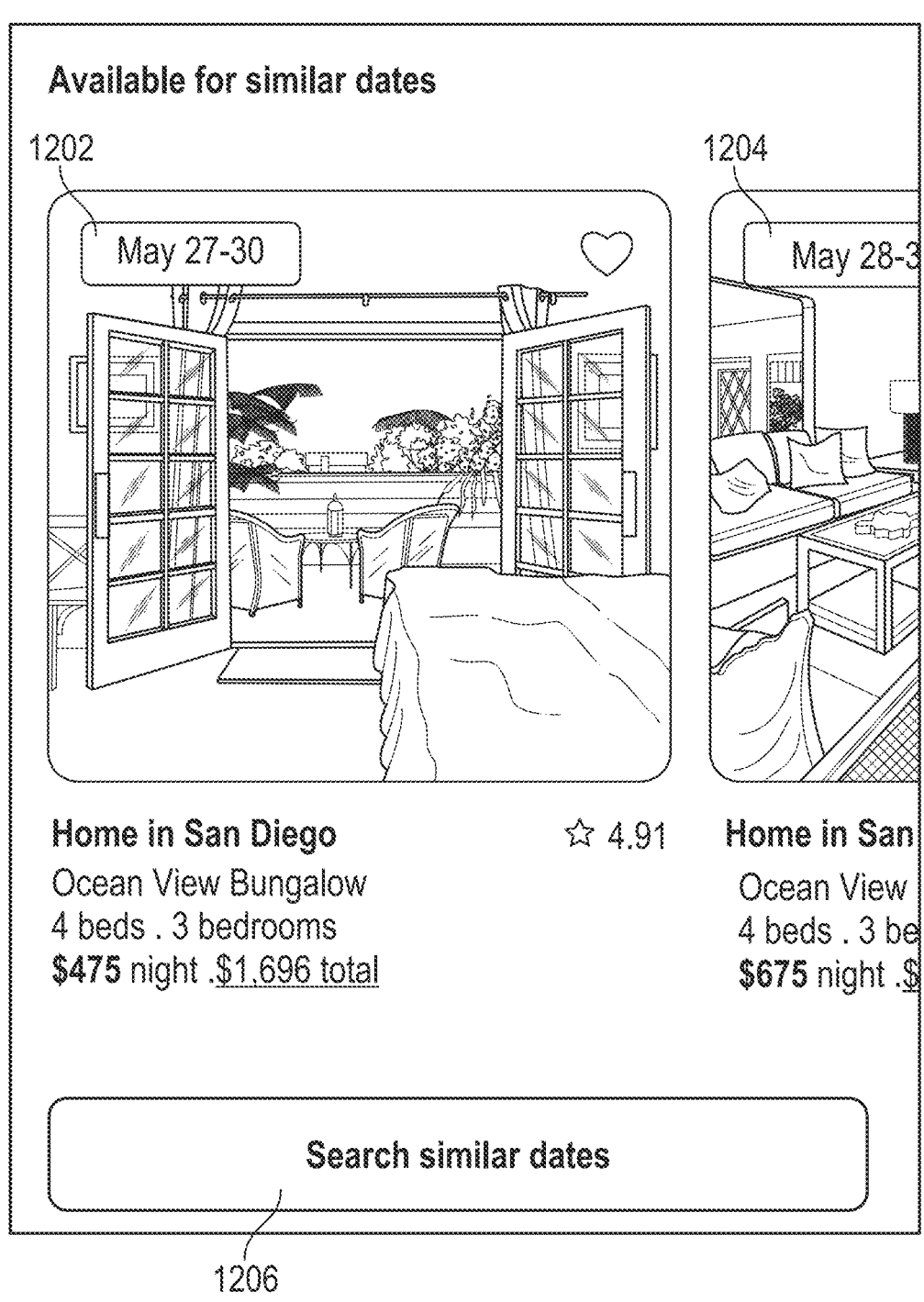
FIG. 12 illustrates an example user interface, according to some examples.

In one example, the one alterative option is an accommodation option available within a specified range of dates based on a date included in the given set of query parameters. For example, the computing system determines that if a user searches similar dates to a date or dates included in the given set of query parameters, the user will have a greater chance of finding an accommodation that meets the user's needs and thus, a greater chance of booking. Using a specific example where the low inventory metric is 0.34 and the predefined threshold is 0.3, the computing system would determine that the low inventory metric is more than the predefined threshold and thus, would cause to display, on a display of a computing device of the user, an option to search for alternative dates to access more accommodations options. For example, FIG. 12 illustrates an example user interface 1200 displayed on a computing device of a user that shows example accommodations 1202 and 1204 that are available for similar dates with an option 1206 to search for accommodations for the similar dates.

As another example, the computing system determines that over a threshold number of searches in a given geographical area result in a low inventory state metric above a predefined threshold. When the computing system receives a search query for the given geographical area, the computing system, in conjunction with causing display of search results for the search query for the given geographical area, causes display of an option to search in an adjacent area with additional search results.

There are many other use cases for the example embodiments described herein. In practice, the LIS metric can be leveraged both offline and online to improve the user search experience. Offline, the LIS metric can be computed for experiments and to analyze how new innovations are driving users to more or less low inventory states. Additionally, the LIS metric can be utilized for analytics to identify opportunities to improve the search experience, such as by flagging paths where users often find themselves in a low inventory state. Finally, the LIS metric can be scored online (e.g., in real time or near real time) and used to power or as an input to product features, such as the triggering criteria for product interventions to help users (e.g., guests) who find themselves with limited available inventory for their search, as explained above.

Figure 13:
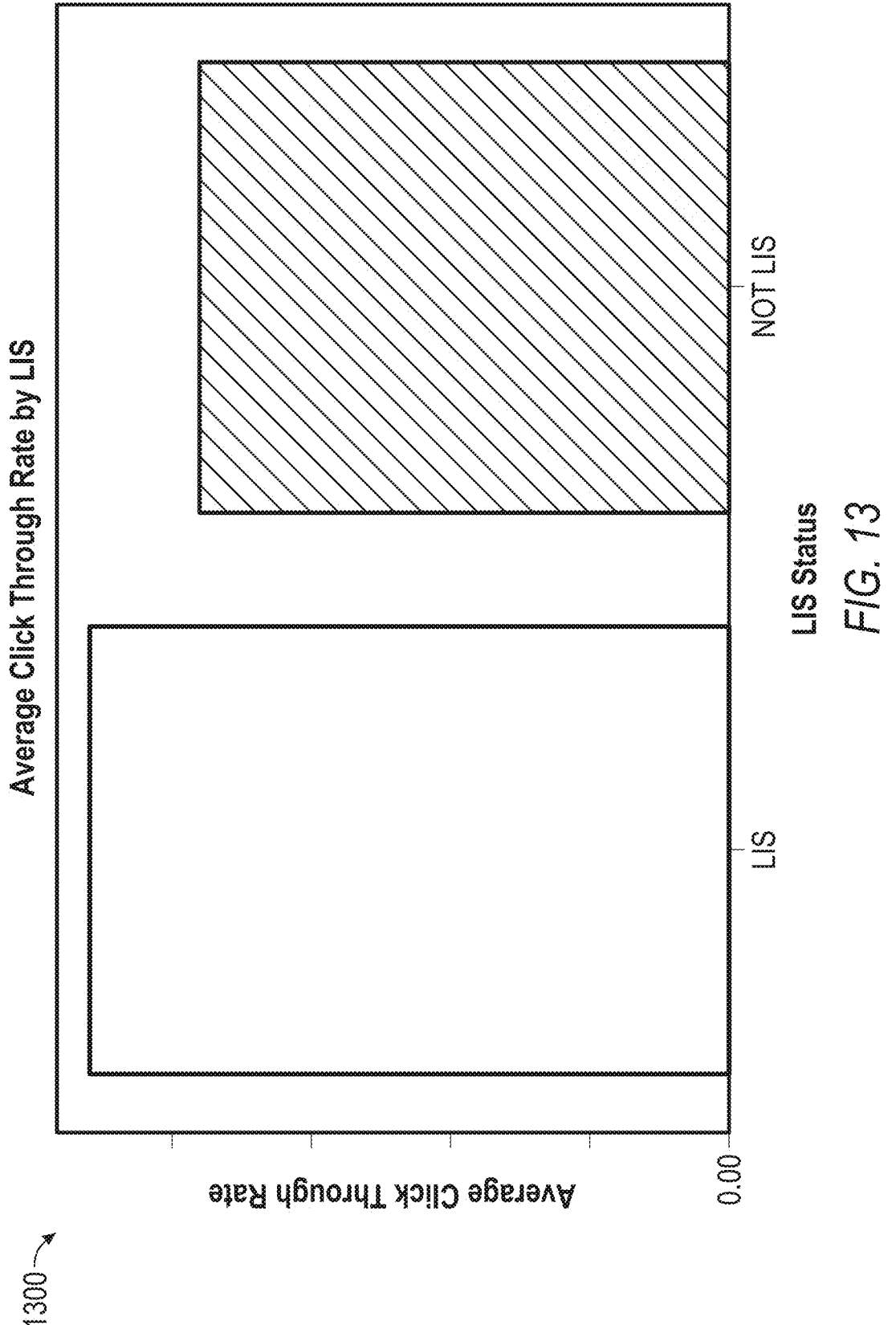
FIG. 13 illustrates click-through rate by LIS classification on alternative listings, according to some examples.

As an example of an online use case, the LIS metric can be used to determine the impact of a product intervention experiment which displays additional search results that are available for dates within a range of +/−1 days, as seen in the graphic 1300 of FIG. 13. The intervention was originally naively only triggered for searches that yielded fewer than a threshold of number of search results. With the LIS metric, however, the under-served query identification system 128 identifies which searches were a low inventory state versus not and analyzes the results across that dimension. The LIS metric described herein is predictive of whether or not the user would click on one of the alternative dates' listings. FIG. 13 illustrates click-through rate by LIS classification on alternative listings. FIG. 13 shows that the click-through rate (search to click on the alternative listings) is 20% higher for LIS searches, demonstrating that the LIS metric is able to identify the users who are more in need of alternative options.

Additionally, the experiment can be utilized to evaluate if LIS searchers in the treatment (users shown alternative listings) versus a control (users not shown alternative listings) have improved conversion. We see that focusing on the LIS searchers in treatment and control, the users in the treatment group show a lift in our leading indicator of bookings metric. In contrast the non-LIS searchers show no lift; demonstrating the LIS metric is able to identify the subset of users who are experiencing a shortage of inventory options which is preventing them from booking. Table 1 below provides a summary of the results for the alternative dates experiment results for LIS versus non-LIS searchers. In summary, the initial aggregate results of the experiment showed no impact to users, however, the LIS model is able to identify the subset of users most in need and benefiting from the intervention. This enables a product team to properly assess the value of the feature and improve the decision-making process; future iterations can leverage the LIS metric as the triggering mechanism for interventions.

| User Group | Leading Indicator Lift | p-value |
|---|---|---|
| All Searchers | Neutral | >0.05 |
| LIS Searchers | Positive | <0.001 ** |
| Non-LIS Searchers | Neutral | >0.05 |

Another area where the LIS metric can be utilized is in inventory management and supply acquisition. Traditionally, the hospitality business relies on hotels and listings occupancy rates to drive supply decisions. If occupancy is high in a certain area that reasonably implies there is a supply shortage. Occupancy, however, is biased by and limited to tracking existing supply. It cannot detect needs in areas where supply does not exist; it also assumes the existing supply is a match for all demand, so it can fail to identify unmet needs of different types of demand. These shortcomings are magnified in the case of online marketplaces, such as Airbnb, as these online marketplaces serve a diverse set of users, ranging from solo travelers to families and large groups, and thus the supply needs to be equally diverse to match to each of the segments of users. The LIS metric is well-tailored for this application as it operates at the search level which includes useful dimensions such as number of guests, accommodation type, price point, and so forth. This granularity enables segmentation and understanding of the search experience of all types of users, and to derive actionable specific insights about the supply needed to meet that demand, such as "users searching for 2 guests accommodations in Long Beach are facing a high share of LIS searches."

It is also possible to characterize granular location demand and LIS. The significance of the location within a city or market cannot be overstated when it comes to a user's choice of accommodations. Preferences for particular neighborhoods or blocks that align with the essence of a user's trip often strongly influence their decision. However, the search experience for users, especially concerning supply availability, can vary dramatically based on the desired area within a city. Hence, it is crucial for to pinpoint regions where users encounter low inventory levels and prioritize acquiring supply in those locations. The challenge lies in the fact that an overwhelming majority of users do not explicitly state their location preferences in their search queries or filters. Instead, they typically conduct a general search, such as "San Francisco," and then navigate to specific neighborhoods or blocks by adjusting the map viewport. This process involves a series of potentially hundreds of pans and zooms of the map viewport, as they explore the various areas of a city or market.

To accurately capture the precise location preferences of a user and integrate them with the LIS metric, the under-served query identification system 128 utilizes a method that consolidates all of a user's map viewport interactions. Utilizing Uber's H3 library, a city or market is partitioned into hexagonal zones. For each user session in the city or market all the hexagons which are viewed within the user's map viewport across the session are analyzed. The under-served query identification system 128 assigns weights to each hexagon based on the total number of hexagons viewed. For instance, consider a user session that encompasses a first search covering hexagons A, B, and C, and a second search (from a map viewport zoom) containing only hexagon B. In total, four hexagons were viewed across these searches. Hexagon B would have a weight of 0.5, while hexagons A and C would each have a weight of 0.25. The sum of weights for all viewed hexagons within each user session are normalized to 1.

Figure 14:
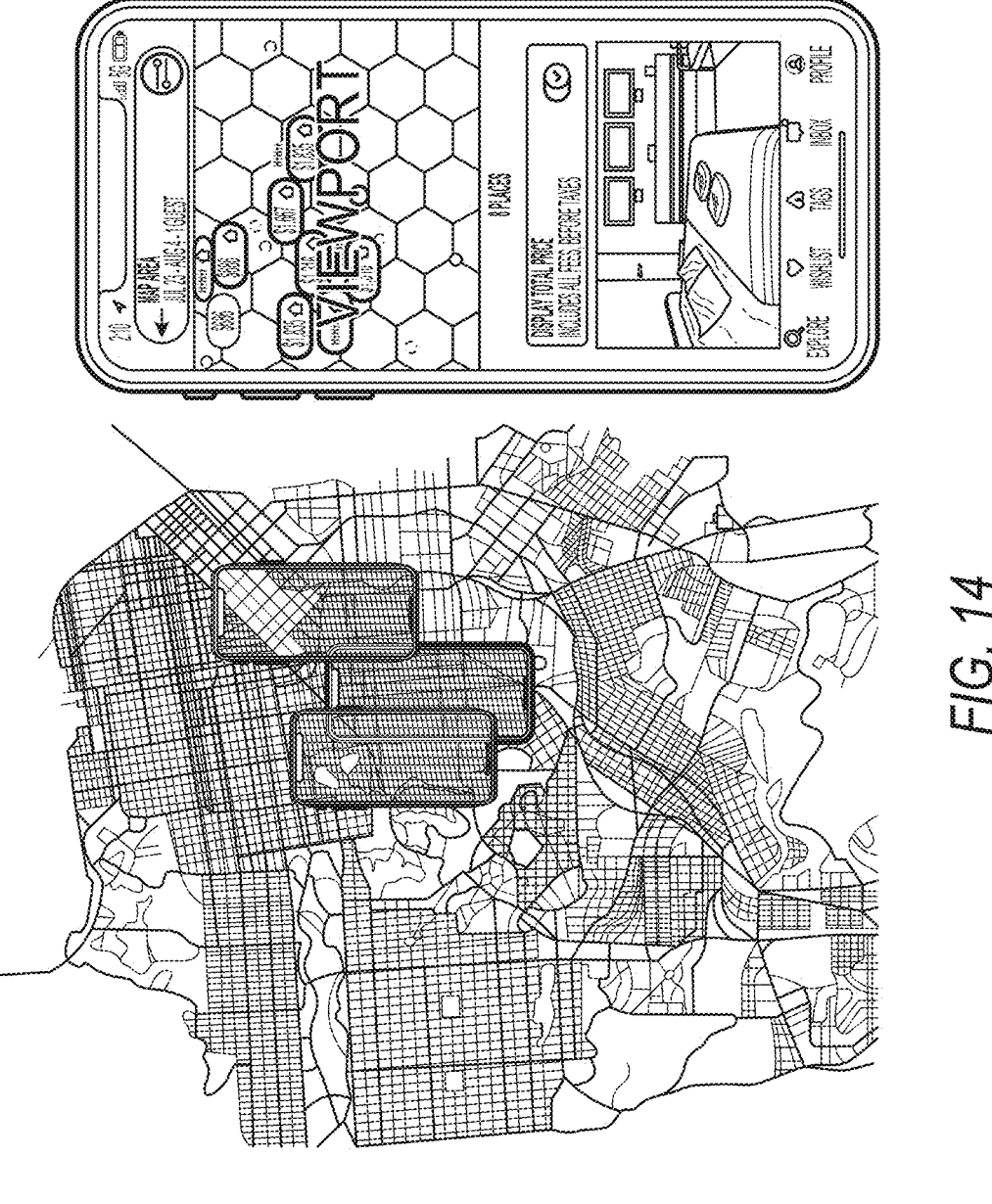
FIG. 14 is an illustration of a series of map viewport movements and their mapping to hexagons, according to some examples.

Using this approach, the under-served query identification system 128 can then associate searches with varying weights to each hexagon. Each search (including map viewport movements) is flagged as LIS or non-LIS using a dummy variable: 0 or 1. The under-served query identification system 128 then computes a LIS score for each hexagon by summing the weights of all searches associated with that hexagon by their corresponding LIS dummy classification, $$\text{LIS\_score}(Hex) = \sum_{S=1}^{n} \text{weight}_{(s,Hex)} \times I_s(LIS),$$

where s is a search covering the Hex, $\text{weight}_{(s,Hex)}$ is the weight of the (search, Hex) pair, and $I_s$ (LIS) is a dummy indicating the LIS status of the search. FIG. 14 is an illustration 1400 of a series of map viewport movements and their mapping to hexagons.

To illustrate an example of the previously defined methodology, the under-served query identification system 128 can identify specific segments that are facing supply constraints in a particular market (e.g., by location and capacity). Using the Los Angeles market as an example, FIG. 15 is a graphic 1500 depicting the specific areas (hexagons) within the Los Angeles market where users are facing a lack of supply. The insights can be further refined by analyzing specific parameters of the LIS searches, such as the guest count, which indicates that in Anaheim, near Disneyland, it is specifically groups of 5+ guests who are experiencing significant supply shortages.

Figure 16:
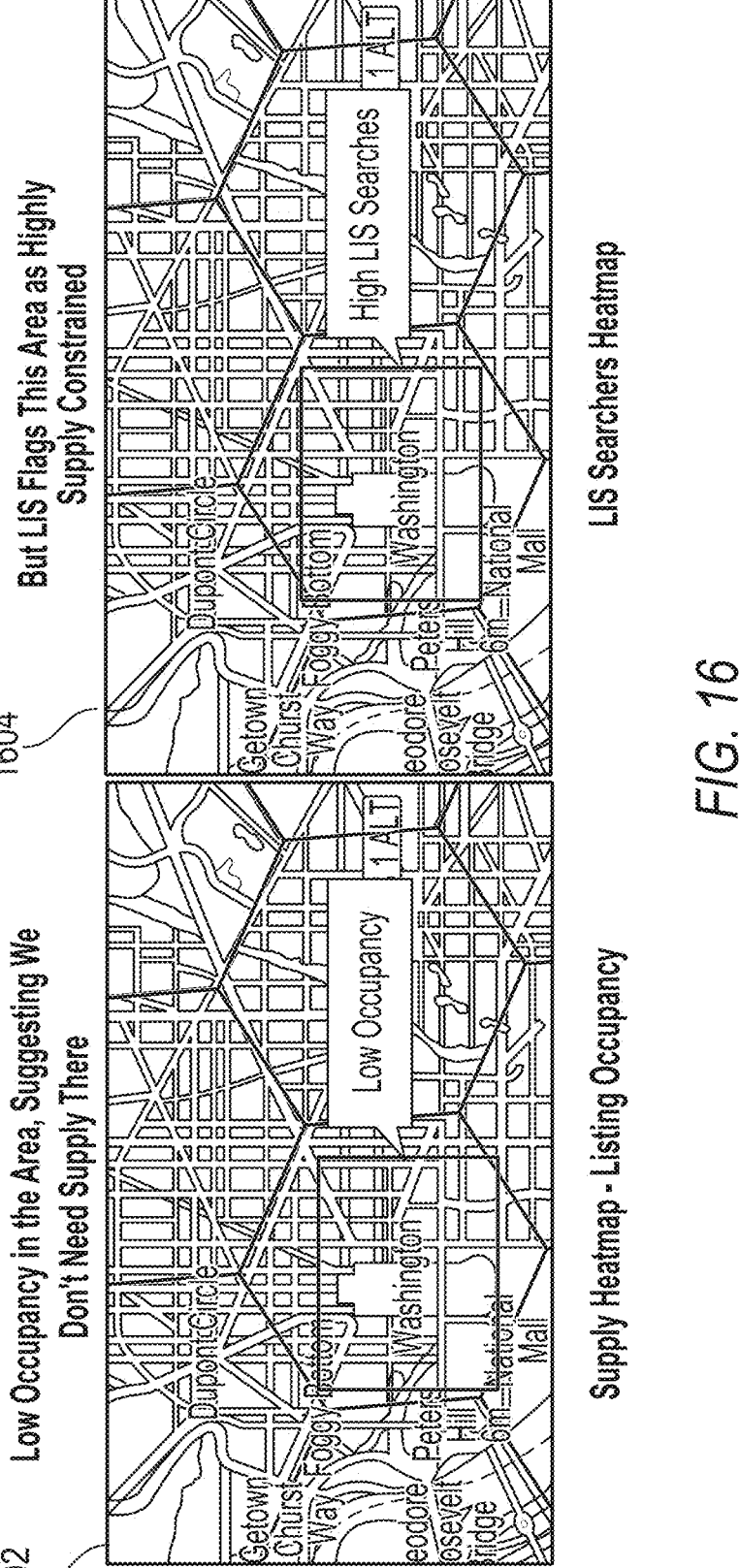
FIG. 16 shows example maps, according to some examples.

The approach described herein offers a comprehensive perspective on supply constraints from the user's point of view. As previously state, traditional hospitality metrics typically rely on occupancy to assess supply constraints. This approach falls short when there is insufficient supply or a lack of the right type of supply in a particular area. To illustrate this point, FIG. 16 shows a first map 1602 that illustrates that near the White House and President's Park in Washington D.C. there is low occupancy, which using traditional methods would indicate no supply problems. However, using the LIS metric, the second map 1604 shows that many searches are facing a lack of supply, and this should instead be an area of supply management focus. The disparity arises because the existing listings are mostly individual room listings, which are a mismatch for the demand seeking accommodations there. Consequently, these listings remain largely unoccupied, distorting the actual supply scenario for users in the area.

The LIS approach provides valuable insights into the supply and demand dynamics within cities and markets. By leveraging the demand-centric LIS metric, we can precisely identify the locations and demand segments which are experiences supply shortages, and the corresponding type of listings that would be most suitable to fulfill that demand.

In sum, described herein is a causal framework on how the number of results returned for a search query can impact a user's booking conversion in an accommodations search. From this framework, a methodology is derived to identify search queries for which the amount of inventory returned is preventing booking conversion. Described herein is how, via simulated data experiments, assessment on real user queries, and an experiments, the validity of the causal model, and its superior performance compared to alternative non-causal methods. Finally, use case scenarios and application and discussed. In particular, LIS is used to identify which searches would benefit from interventions such as expanding the inventory, such as by using alternative dates. Also, the LIS metric provides and insightful and actionable lens on supply constraints by identifying unmet demand precision.

Alternative modeling approaches can be used in example embodiments for estimating the expected number of search results for bookers and all searchers. For example, example embodiments described herein utilize Poisson regression, but a negative binomial approach may perform better given the high dispersion of the number of search results. Ultimately, any improvements in the ability to estimate the expected number of results will lead to an improvement in the ability to identify search queries with an insufficient number of results returned. Additionally, conducting additional online experiments for inventory expansion scenarios help further validate findings and identify potential areas for enhancement.

Figure 20:
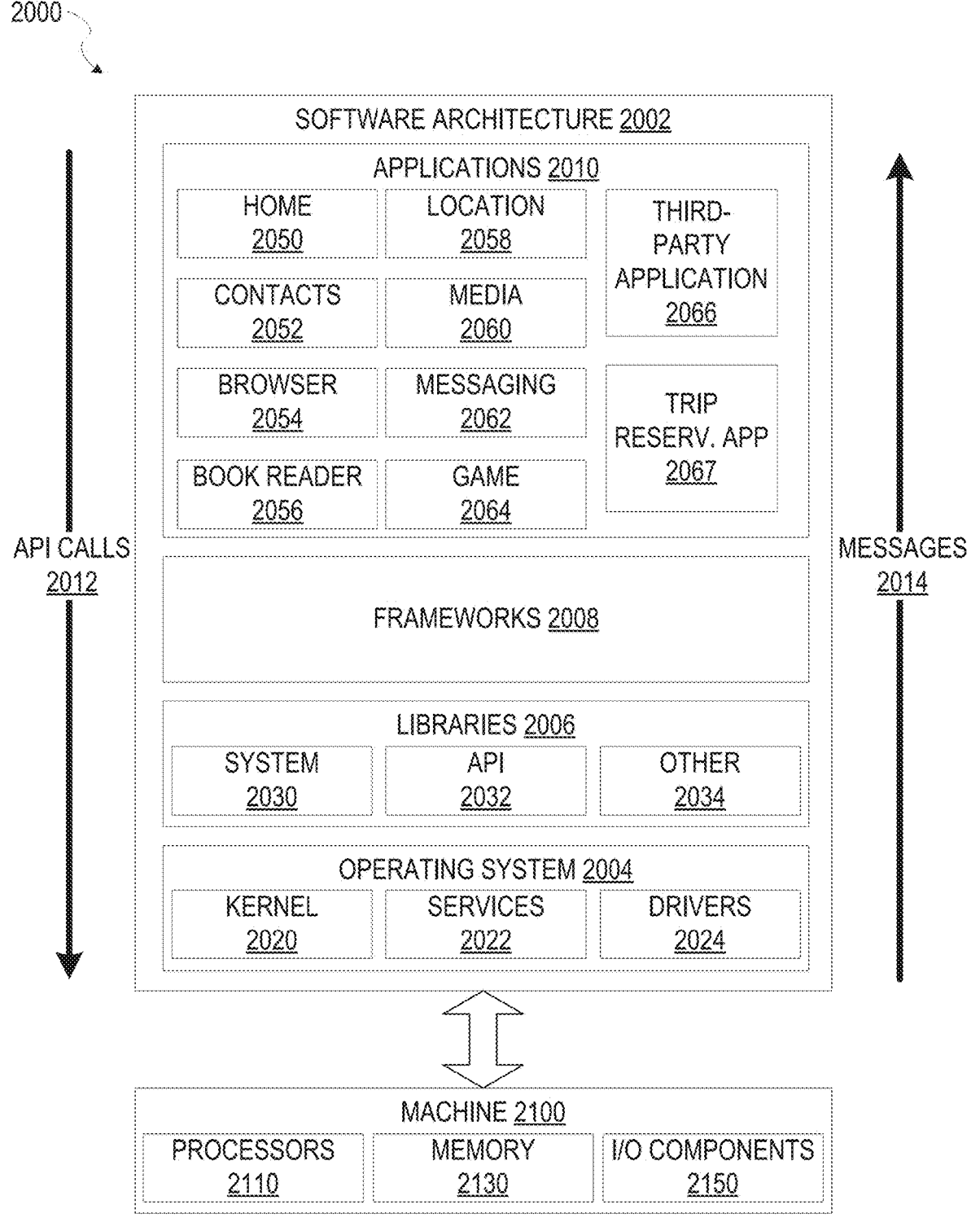
FIG. 20 is a block diagram illustrating an example of a software architecture that may be installed on a machine, according to some examples.

FIG. 20 is a block diagram 2000 illustrating a software architecture 2002, which can be installed on any one or more of the devices described above. For example, in various embodiments, the client device 110 and server systems 130, 102, 120, 122, and 124 may be implemented using some or all of the elements of the software architecture 2002. FIG. 20 is merely a nonlimiting example of a software architecture, and it will be appreciated that many other architectures can be implemented to facilitate the functionality described herein. In various embodiments, the software architecture 2002 is implemented by hardware such as a machine 2100 of FIG. 21 that includes processors 2110, memory 2130, and input/output (I/O) components 2150. In this example, the software architecture 2002 can be conceptualized as a stack of layers where each layer may provide a particular functionality. For example, the software architecture 2002 includes layers such as an operating system 2004, libraries 2006, frameworks 2008, and applications 2010. Operationally, the applications 2010 invoke API calls 2012 through the software stack and receive messages 2014 in response to the API calls 2012, consistent with some embodiments.

In various implementations, the operating system 2004 manages hardware resources and provides common services. The operating system 2004 includes, for example, a kernel 2020, services 2022, and drivers 2024. The kernel 2020 acts as an abstraction layer between the hardware and the other software layers, consistent with some embodiments. For example, the kernel 2020 provides memory management, processor management (e.g., scheduling), component management, networking, and security settings, among other functionalities. The services 2022 can provide other common services for the other software layers. The drivers 2024 are responsible for controlling or interfacing with the underlying hardware, according to some embodiments. For instance, the drivers 2024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 2006 provide a low-level common infrastructure utilized by the applications 2010. The libraries 2006 can include system libraries 2030

(e.g., C standard library) that can provide functions such as memory allocation functions, string manipulation functions, mathematic functions, and the like. In addition, the libraries 2006 can include API libraries 2032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and in three dimensions (3D) on a display), database libraries (e.g., SQLite to provide various relational database functions), web libraries (e.g., WebKit to provide web browsing functionality), and the like. The libraries 2006 can also include a wide variety of other libraries 2034 to provide many other APIs to the applications 2010.

The frameworks 2008 provide a high-level common infrastructure that can be utilized by the applications 2010, according to some embodiments. For example, the frameworks 2008 provide various graphic user interface (GUI) functions, high-level resource management, high-level location services, and so forth. The frameworks 2008 can provide a broad spectrum of other APIs that can be utilized by the applications 2010, some of which may be specific to a particular operating system 2004 or platform.

In an example embodiment, the applications 2010 include a home application 2050, a contacts application 2052, a browser application 2054, a book reader application 2056, a location application 2058, a media application 2060, a messaging application 2062, a game application 2064, and a broad assortment of other applications, such as a third-party application 2066. According to some embodiments, the applications 2010 are programs that execute functions defined in the programs. Various programming languages can be employed to create one or more of the applications 2010, structured in a variety of manners, such as object-oriented programming languages (e.g., Objective-C, Java, C++) or procedural programming languages (e.g., C or assembly language). In a specific example, the third-party application 2066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2066 can invoke the API calls 2012 provided by the operating system 2004 to facilitate functionality described herein.

Some embodiments may particularly include a trip reservation application 2067, which may be any application that requests data or other tasks to be performed by systems and servers described herein, such as the server system 102, third-party servers 130, and so forth. In certain embodiments, this may be a standalone application that operates to manage communications with a server system such as the third-party servers 130 or server system 102. In other embodiments, this functionality may be integrated with another application. The trip reservation application 2067 may request and display various data related to an online marketplace and may provide the capability for a user 106 to input data related to the system via voice, a touch interface, or a keyboard, or using a camera device of the machine 2100, communication with a server system via the I/O components 2150, and receipt and storage of object data in the memory 2130. Presentation of information and user inputs associated with the information may be managed by the trip reservation application 2067 using different frameworks 2008, library 2006 elements, or operating system 2004 elements operating on a machine 2100.

Figure 21:
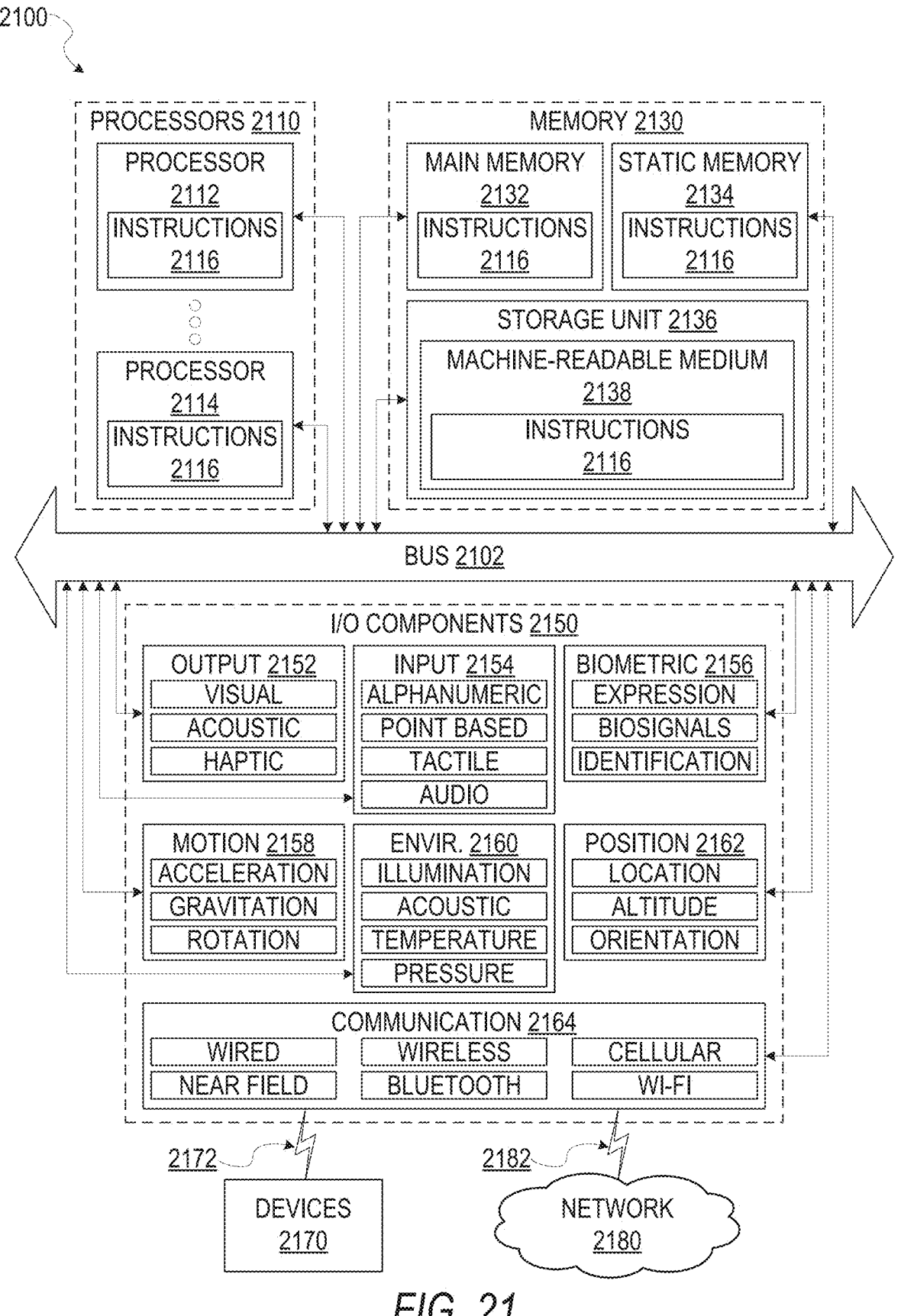
FIG. 21 illustrates a diagrammatic representation of a machine, in the form of a computer system, within which a set of instructions may be executed for causing the machine to perform any one or more of the methodologies discussed herein, according to an examples.

FIG. 21 is a block diagram illustrating components of a machine 2100, according to some embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2116 (e.g., software, a program, an application 2010, an applet, an app, or other executable code) for causing the machine 2100 to perform any one or more of the methodologies discussed herein can be executed. In alternative embodiments, the machine 2100 operates as a standalone device or can be coupled (e.g., networked) to other machines. In a networked deployment, the machine 2100 may operate in the capacity of a server system 130, 102, 120, 122, 124, and the like, or a client device 110 in a server-client network environment, or as a peer machine in a peer-to-peer (or distributed) network environment. The machine 2100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

In various embodiments, the machine 2100 comprises processors 2110, memory 2130, and I/O components 2150, which can be configured to communicate with each other via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 2112 and a processor 2114 that may execute the instructions 2116. The term "processor" is intended to include multi-core processors 2110 that may comprise two or more independent processors 2112, 2114 (also referred to as "cores") that can execute instructions 2116 contemporaneously. Although FIG. 21 shows multiple processors 2110, the machine 2100 may include a single processor 2110 with a single core, a single processor 2110 with multiple cores (e.g., a multi-core processor 2110), multiple processors 2112, 2114 with a single core, multiple processors 2112, 2114 with multiple cores, or any combination thereof.

The memory 2130 comprises a main memory 2132, a static memory 2134, and a storage unit 2136 accessible to the processors 2110 via the bus 2102, according to some embodiments. The storage unit 2136 can include a machine-readable medium 2138 on which are stored the instructions 2116 embodying any one or more of the methodologies or functions described herein. The instructions 2116 can also reside, completely or at least partially, within the main memory 2132, within the static memory 2134, within at least one of the processors 2110 (e.g., within the processor's cache memory), or any suitable combination thereof, during execution thereof by the machine 2100. Accordingly, in various embodiments, the main memory 2132, the static memory 2134, and the processors 2110 are considered machine-readable media 2138.

As used herein, the term "memory" refers to a machine-readable medium 2138 able to store data temporarily or permanently and may be taken to include, but not be limited to, random-access memory (RAM), read-only memory (ROM), buffer memory, flash memory, and cache memory. While the machine-readable medium 2138 is shown, in an example embodiment, to be a single medium, the term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., instructions 2116) for execution by a machine (e.g., machine 2100), such that the instructions 2116, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other nonvolatile memory (e.g., erasable programmable read-only memory (EPROM)), or any suitable combination thereof. The term "machine-readable medium" specifically excludes nonstatutory signals per se.

The I/O components 2150 include a wide variety of components to receive input, provide output, produce output, transmit information, exchange information, capture measurements, and so on. In general, it will be appreciated that the I/O components 2150 can include many other components that are not shown in FIG. 21. The I/O components 2150 are grouped according to functionality merely for simplifying the following discussion, and the grouping is in no way limiting. In various example embodiments, the I/O components 2150 include output components 2152 and input components 2154. The output components 2152 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 2150 include biometric components 2156, motion components 2158, environmental components 2160, or position components 2162, among a wide array of other components. For example, the biometric components 2156 include components to detect expressions (e.g., hand expressions, facial expressions, vocal expressions, body gestures, eye tracking), measure biosignals (e.g., blood pressure, heart rate, body temperature, perspiration, brain waves), identify a person (e.g., voice identification, retinal identification, facial identification, fingerprint identification, electroencephalogram-based identification), and the like. The motion components 2158 include acceleration sensor components (e.g., accelerometer), gravitation sensor components, rotation sensor components (e.g., gyroscope), and so forth. The environmental components 2160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2162 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 include a network interface component or another suitable device to interface with the network 2180. In further examples, communication components 2164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 2170 may be another machine 2100 or any of a wide variety of peripheral devices (e.g., a peripheral device coupled via a USB).

Moreover, in some embodiments, the communication components 2164 detect identifiers or include components operable to detect identifiers. For example, the communication components 2164 include radio frequency identification (RFID) tag reader components, NFC smart tag detection components, optical reader components (e.g., an optical sensor to detect one-dimensional bar codes such as a Universal Product Code (UPC) bar code, multidimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2164, such as location via Internet Protocol (IP) geo-location, location via WI-FI® signal triangulation, location via detecting a BLU-ETOOTH® or NFC beacon signal that may indicate a particular location, and so forth.

In various example embodiments, one or more portions of the network 2180 can be an ad hoc network, an intranet, an extranet, a VPN, a LAN, a WLAN, a WAN, a WWAN, a MAN, the internet, a portion of the internet, a portion of the PSTN, a plain old telephone service (POTS) network, a cellular telephone network, a wireless network, a WI-FI® network, another type of network, or a combination of two or more such networks. For example, the network 2180 or a portion of the network 2180 may include a wireless or cellular network, and the coupling 2182 may be a Code Division Multiple Access (CDMA) connection, a Global System for Mobile (GSM) communications connection, or another type of cellular or wireless coupling. In this example, the coupling 2182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), World-wide Interoperability for Microwave Access (WiMAX), Long-Term Evolution (LTE) standard, others defined by various standard-setting organizations, other long-range protocols, or other data transfer technology.

In example embodiments, the instructions 2116 are transmitted or received over the network 2180 using a transmission medium via a network interface device (e.g., a network interface component included in the communication components 2164) and utilizing any one of a number of well-known transfer protocols (e.g., HTTP). Similarly, in other example embodiments, the instructions 2116 are transmitted or received using a transmission medium via the coupling 2172 (e.g., peer-to-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 2138 "nontransitory" should not be construed to mean that the medium is incapable of movement; the machine-readable medium 2138 should be considered as being transportable from one physical location to another. Additionally, since the machine-readable medium 2138 is tangible, the machine-readable medium 2138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

APPENDIX A: SUPPLEMENTARY STEPS TO OBTAIN THE RESULTS ON INCREMENTALITY $$BookIncr_{qry} = \frac{P(B = 1|R + 1, QP, I = 1)}{P(B = 1|R, QP, I = 1)}$$

Using Bayes theorem, the numerator and denominator can be rewritten as follows:

$$P(B = 1|R + 1, QP, I = 1) =$$

$$\frac{P(R + 1|B = 1, QP, I = 1) \times P(B = 1|QP, I = 1)}{P(R + 1|QP, I = 1)}$$

$$P(B = 1|R, QP, I = 1) = \frac{P(R|B = 1, QP, I = Q) \times P(B = 1|QP, I = 1)}{P(R|QP, I = 1)}$$

and obtain:

$$BookIncr_{qry} = \frac{P(R + 1|B = 1, QP, I = 1) \times P(R|QP, I = 1)}{P(R|B = 1, QP, I = 1) \times P(R + 1|QP, I = 1)}$$

APPENDIX B: RELATIONSHIP WITH PROPENSITY SCORE MATCHING

The same solution can be framed with a propensity score approach. The treatment (TE) can be viewed as adding one additional result, therefore writing the treatment effect (TE) as follows:

$$(T = 1) = R + 1$$

$$(T = 0) = R$$

$$TE = P(B = 1|R + 1, QP)P(B = 1|R, QP)$$

$$TE = P(B = 1|T = 1, QP)P(B = 1|T = 0, QP)$$

Here QP (query parameters) is a list of covariates such as $$QP \perp\!\!\!\perp T | b(QP)$$

where $b(x)$ is a balancing score i.e., a function of the observed covariates x such that the conditional distribution of x given $b(x)$ is the same for treated (T=1) and control (T=0)

A fitting propensity score (that is a balancing score) in that context is:

$$b(QP)=Pr(R|QP) \qquad (7)$$

Searches that have the same balancing score, in this case the same expectation of number of results can serve as unbiased subjects to estimate the treatment effect.

The above shows that the same methodology of first estimating the expected number of results given the search parameter to derive the effect on an additional result can be framed as a propensity score matching method.

APPENDIX C: SIMULATION

Simulation Process

A simulation was designed that adheres to the causal relationships presented in FIG. 6. The simulation data is generated as follows:

(1) randomly generate a user's intention to book: 0 or 1 (intent), (2) if intent is 1 then assign a higher probability that filtering (0 or 1) is used, (3) generate the number of results from a Poisson distribution with the rate parameter influenced by filtering (if filtering is used, we draw less results).

(4) Finally, randomly generate a binary booking outcome:
  (a) 0, if intent is 0,
  (b) binom(p), with p scaling with the number of results if intent is 1.

(5) The true incremental impact (not observable in the realworld context)

$$\frac{P(B = 1|R + 1)}{P(B = 1|R)}$$

is also computed for each simulated data point.

Simulation against benchmark. Simulation (2) is designed to compare the performance of the method versus the "direct booking method" under the scenario where data is generated in a manner that favors the benchmark. Data is generated by drawings results from over-dispersed data (violating the Poisson distribution assumption), and the impact of results on conversion is computer using a linear logistic transform, the same specification and assumptions as the direct booking method.

The focus is on comparing each method's ability to estimate the ground truth odds ration for two key classes of queries: (1) user queries with filtering applied, and (2) queries with no filtering. Each class of queries should have varying levels of impact from a lack of search results, specifically we should observe:

(1) For queries with filtering, the impact (odds ratio) of fewer search results should be larger. Users who filter are more likely to be high intent, therefore the number of search results will presumably impact their booking outcome more.

(2) For queries without filtering, the impact (odds ratio) should be less, as users without filtering are lower intent and therefore their chances of booking are low regardless of the number of search results.

(3) For both classes of queries, the impact on conversion should exponentially decay with the number of search results.

It is most important, and the main evaluation criteria, that each method can properly capture the above trends. The final application of any method to identify low inventory searches will require us to set some classification threshold. Therefore, as long as the estimations follow the proper trends with respect to query types and number of results, the method will be valuable for identifying low inventory states.

Figure 17:
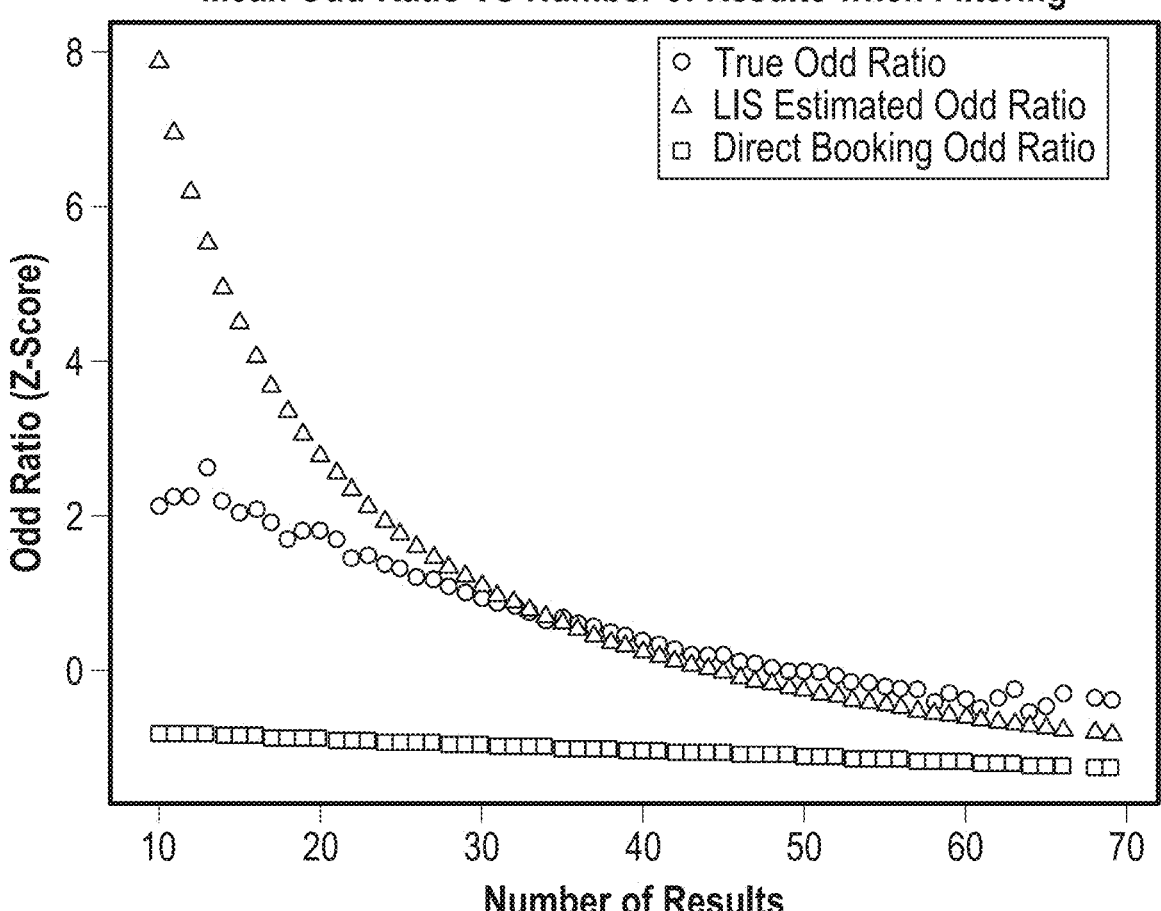
FIG. 17 illustrates observed and estimated odd rations when filtering, according to some examples.
Figure 18:
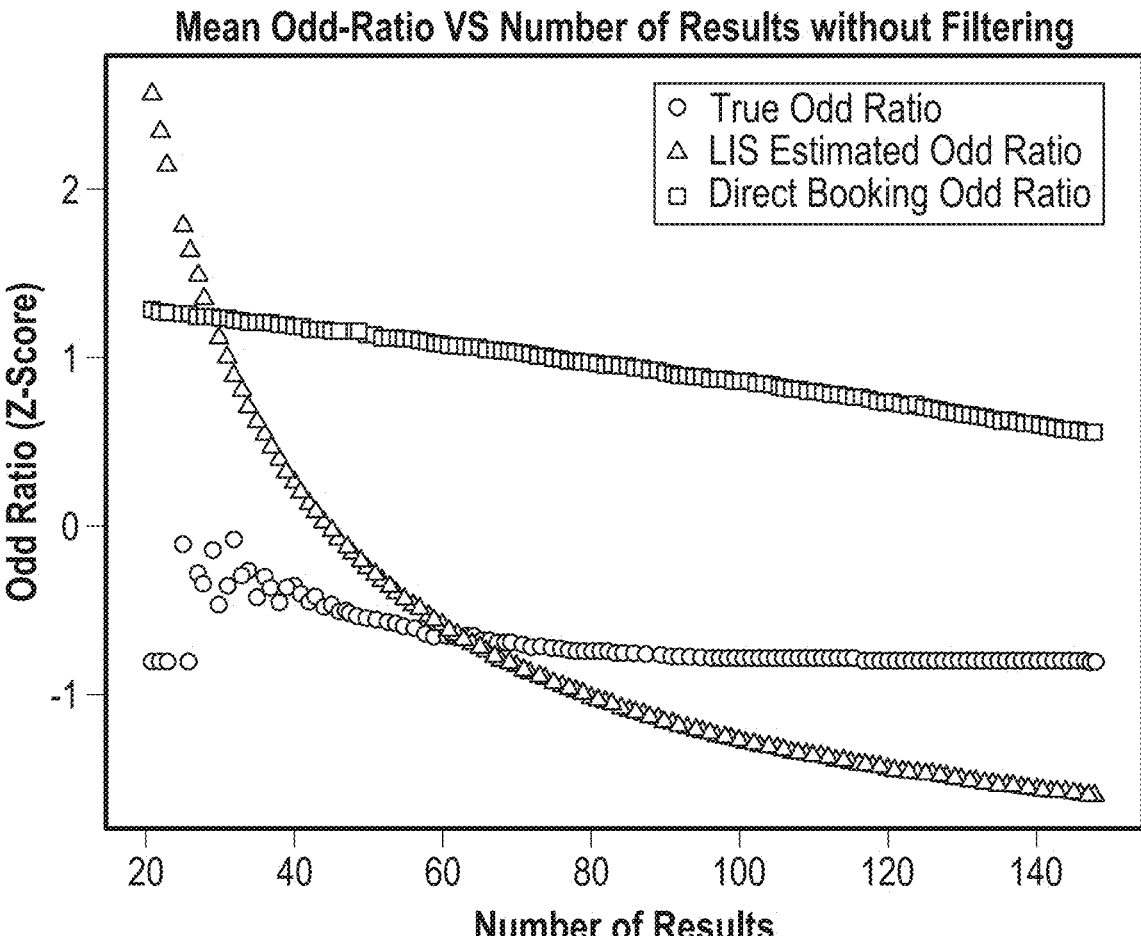
FIG. 18 illustrates observed and estimated odd rations without filtering, according to some examples.

FIGS. 17 and 18 present the estimation results 1700 and 1800 for each method for filtered queries and unfiltered queries respectively. For example, FIG. 17 illustrates the observed and estimated odd rations when filtering and FIG. 18 illustrates the observed and estimated odd rations without filtering. For readability purposes we choose to display the z-score of the estimations. Despite the intentional misspecification of the generated data, the LIS method more closely estimates the ground truth odds ratio. Most importantly, it captures all the desired trends with respect to the classes of queries and number of results. The decay shape of the LIS method is only weakly aligned with the ground truth. This is due to the Poisson distribution assumption, a low variance estimate is connected to a low probability value from the pmf; therefore, pulling the estimates down for the low number of search results scenarios.

Figure 19:
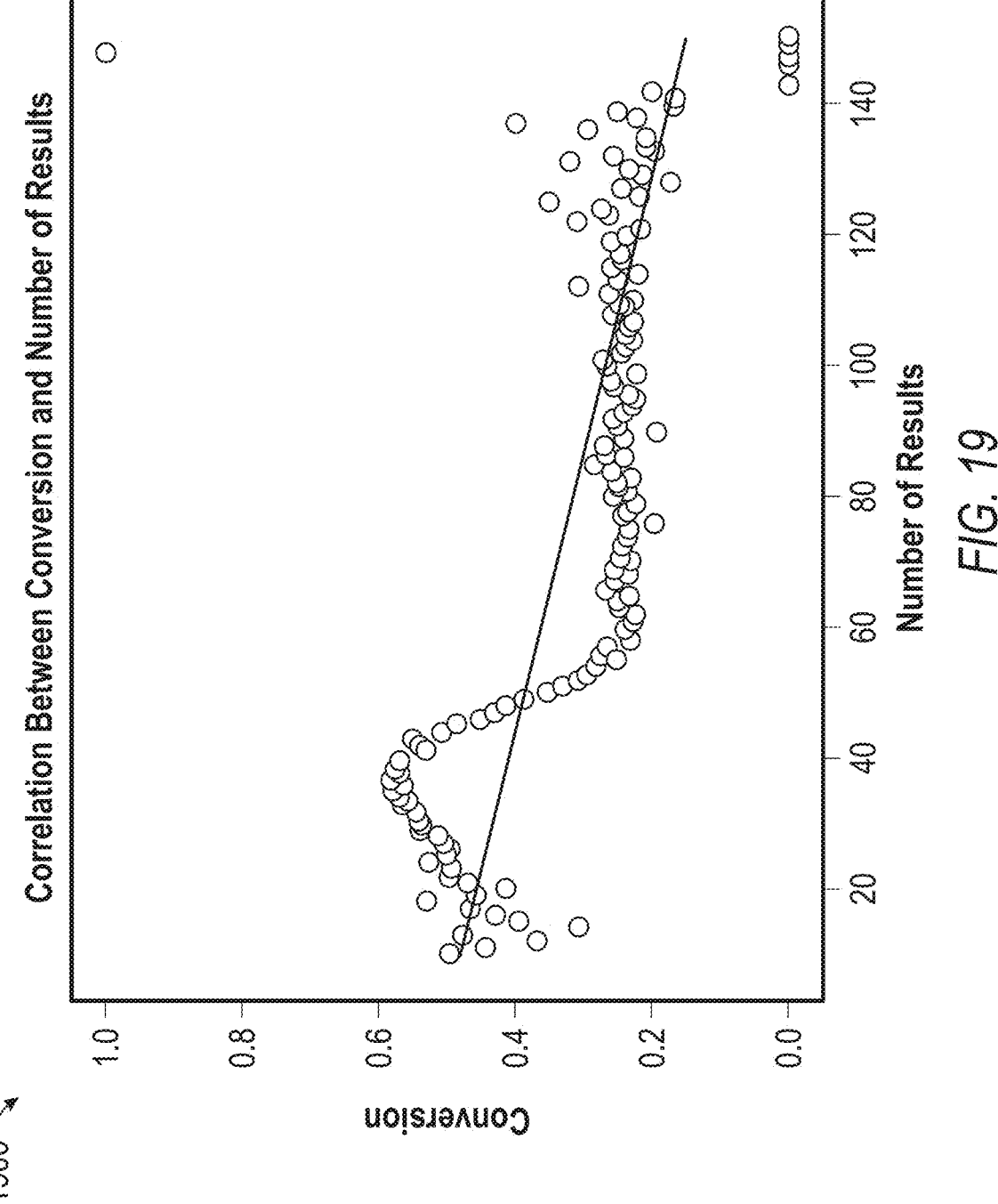
FIG. 19 shows the correlation between number of results and conversion (simulation), according to some examples.

In contrast, the direct booking method does not capture well the differences in impact between the two classes of queries, nor does it follow the exponential decay shape of the ground truth. The method suffers from an identification issue as it is not able to account for the confoundedness of intent (through filtering) on the relationship between the number of results and conversion. More specifically, users with high intent are more likely to obtain fewer results but still have a high chance to book, whereas users with less intent observe more results but have low probability of booking. This results in the trend that conversion is negatively correlated with the number of results, as shown in the graph 1900 of FIG. 19. Specifically, FIG. 19 shows the correlation between number of results and conversion (simulation). Including filtering as a feature in the logistic regression helps mitigate this phenomenon, but as shown in the estimation results it is not enough to capture the true relationship between conversion and the number of search results.

CODE

```
1    def incr_poisson ( lbda_booked , lbda , num_res ):
2        # lbda_booked : predicted num results booked
3        # lbda : predicted num results
4        # num_res : actually observed num results
5        numerator = poisson . logpmf ( num_res + 1, mu =
             lbda_booked + num_res + 1) + poisson .
             logpmf ( num_res , mu= lbda + num_res , loc = –
             num_res )
6        denominator = poisson . logpmf ( num_res , mu =
             lbda_booked + num_res , loc = –num_res ) +
             poisson . logpmf ( num_res + 1, mu= lbda +
             num_res + 1, loc = –num_res –1)
7        # scipy does not allow non int values , we use
             loc to accomodate this
8        return max (1, np. exp ( numerator – denominator ))
```

What is claimed is:

1. A computer-implemented method, comprising:

receiving a search query comprising a given set of query parameters;

generating an actual number of search results for the given set of query parameters in an online marketplace;

generating a total estimated number of search results for the given set of query parameters based on historical search data in the online marketplace;

training a machine learning model, using the historical search data for a specified time period that resulted in a user conversion in an area searched, to analyze the historical search data in the online marketplace for users who converted to generate a conversion estimated number of search results for users who converted for a given set of query parameters;

generating, by the trained machine learning model, a conversion estimated number of search results for users who converted for the given set of query parameters;

determining a first probability of getting the actual number of search results plus one given the conversion estimated number of search results;

determining a second probability of getting the actual number of search results given the total estimated number of search results;

determining a third probability of getting the actual number of search results given the conversion estimated number of search results;

determining a fourth probability of getting the actual number of search results plus one given the total estimated number of search results;

generating a low inventory state metric based on the first probability, second probability, third probability and fourth probability;

determining that the low inventory state metric exceeds a predefined threshold; and in response to determining that the low inventory state metric exceeds the predefined threshold, performing operations, in real time or near real time from receiving the search query, comprising:

changing at least one query parameter of the given set of query parameters, the at least one query parameter comprising a geographic location or a date;

generating, using the changed at least one query parameter, at least one alternative option not included in a list of options in search results to be displayed on a display of a computing device; and causing the at least one alternative option not included in a list of options in search results to be displayed on the display of a computing device.

2. The computer-implemented method of claim 1, further comprising:

determining a given geographical region with low inventory levels by performing operations comprising:

partitioning the given geographical region into hexagonal zones;

assigning weights to each hexagon of the hexagonal zones based on a total number of hexagons viewed within a user's map viewport in a user session;

associating each user search with varying weights to each hexagon;

computing a low inventory state metric by summing the weights of all searches associated with a given hexagon; and determining that the given geographical region has a low inventory level based on the low inventory state metric for hexagons zones in the given geographical region.

3. The computer-implemented method of claim 2, further comprising:

causing display of a graphic depicting hexagonal zones in the given geographical region with low inventory levels.

4. The computer-implemented method of claim 3, wherein the graphic further indicates a number of users who are experience supply shortages.

5. The computer-implemented method of claim 2, wherein a sum of all weights for all viewed hexagons within each user session are normalized to 1.

6. The computer-implemented method of claim 1, wherein the at least one alternative option is an accommodation option available within a specified range of dates based on a date included in the given set of query parameters.

7. The computer-implemented method of claim 6, further comprising:

displaying, on the display of the computing device, an option to search for accommodations with the specified range of dates.

8. The computer-implemented method of claim 1, wherein generating the low inventory state metric based on the first probability, second probability, third probability and fourth probability further comprises:

multiplying the first probability by the second probability to generate a first value;

multiplying the third probability by the fourth probability to generate a second value; and generating the low inventory state metric by dividing the first value by the second value.

9. The computer-implemented method of claim 1, further comprising:

training a machine learning model, using the historical search data for a specified time period, to analyze the historical search data in the online marketplace to generate a total estimated number of search results for a given set of query parameters; and wherein the total estimated number of search results for the given set of query parameters based on historical search data in the online marketplace is generated by the machine learning model.

10. The computer-implemented method of claim 1, wherein the total estimated number of search results for the given set of query parameters based on historical search data in the online marketplace is generated based on an average of historical search results for the given set of query parameters.

11. The computer-implemented method of claim 1, wherein the low inventory state metric is a value indicating an increase in probability of conversion if the actual number of search results includes one more search result.

12. The computer-implemented method of claim 1, further comprising:

determining that over a threshold number of searches in a given geographical area result in a low inventory state metric above a predefined threshold; and in conjunction with causing display of search results for the search query, causing display of an option to search in an adjacent area to a geographical area associated with the search query with additional search results.

13. A computing system comprising:

a memory that stores instructions; and one or more processors configured by the instructions to perform operations comprising:

receiving a search query comprising a given set of query parameters;

generating an actual number of search results for the given set of query parameters in an online marketplace;

generating a total estimated number of search results for the given set of query parameters based on historical search data in the online marketplace;

training a machine learning model, using the historical search data for a specified time period that resulted in a user conversion in an area searched, to analyze the historical search data in the online marketplace for users who converted to generate a conversion estimated number of search results for users who converted for a given set of query parameters;

generating, by the trained machine learning model, a conversion estimated number of search results for users who converted for the given set of query parameters;

determining a first probability of getting the actual number of search results plus one given the conversion estimated number of search results;

determining a second probability of getting the actual number of search results given the total estimated number of search results;

determining a third probability of getting the actual number of search results given the conversion estimated number of search results;

determining a fourth probability of getting the actual number of search results plus one given the total estimated number of search results;

generating a low inventory state metric based on the first probability, second probability, third probability and fourth probability;

determining that the low inventory state metric exceeds a predefined threshold; and in response to determining that the low inventory state metric exceeds the predefined threshold, performing operations, in real time or near real time from receiving the search query, comprising:

changing at least one query parameter of the given set of query parameters, the at least one query parameter comprising a geographic location or a date;

generating, using the changed at least one query parameter, at least one alternative option not included in a list of options in search results to be displayed on a display of a computing device; and causing the at least one alternative option not included in a list of options in search results to be displayed on the display of a computing device.

14. The computing system of claim 13, wherein generating the low inventory state metric based on the first probability, second probability, third probability and fourth probability further comprises:

multiplying the first probability by the second probability to generate a first value;

multiplying the third probability by the fourth probability to generate a second value; and generating the low inventory state metric by dividing the first value by the second value.

15. The computing system of claim 13, the operations further comprising:

training a machine learning model, using the historical search data for a specified time period, to analyze the historical search data in the online marketplace to generate a total estimated number of search results for a given set of query parameters; and wherein the total estimated number of search results for the given set of query parameters based on historical search data in the online marketplace is generated by the machine learning model.

16. The computing system of claim 13, wherein the total estimated number of search results for the given set of query parameters based on historical search data in the online marketplace is generated based on an average of historical search results for the given set of query parameters.

17. The computing system of claim 13, wherein the conversion estimated number of search results for users who converted for the given set of query parameters is generated based on an average of historical search results for the given set of query parameters.

18. The computer-implemented method of claim 1, wherein the conversion estimated number of search results for users who converted for the given set of query parameters is generated based on an average of historical search results for the given set of query parameters.

19. The computing system of claim 13, wherein the at least one alternative option is an accommodation option available within a specified range of dates based on a date included in the given set of query parameters.

20. A nontransitory computer-readable medium comprising instructions stored thereon that are executable by at least one processor to cause a computing system to perform operations comprising:

receiving a search query comprising a given set of query parameters;

generating an actual number of search results for the given set of query parameters in an online marketplace;

generating a total estimated number of search results for the given set of query parameters based on historical search data in the online marketplace;

training a machine learning model, using the historical search data for a specified time period that resulted in a user conversion in an area searched, to analyze the historical search data in the online marketplace for users who converted to generate a conversion estimated number of search results for users who converted for a given set of query parameters;

generating, by the trained machine learning model, a conversion estimated number of search results for users who converted for the given set of query parameters;

determining a first probability of getting the actual number of search results plus one given the conversion estimated number of search results;

determining a second probability of getting the actual number of search results given the total estimated number of search results;

determining a third probability of getting the actual number of search results given the conversion estimated number of search results;

determining a fourth probability of getting the actual number of search results plus one given the total estimated number of search results;

generating a low inventory state metric based on the first probability, second probability, third probability and fourth probability;

determining that the low inventory state metric exceeds a predefined threshold; and in response to determining that the low inventory state metric exceeds the predefined threshold, performing operations, in real time or near real time from receiving the search query, comprising:

changing at least one query parameter of the given set of query parameters, the at least one query parameter comprising a geographic location or a date;

generating, using the changed at least one query parameter, at least one alternative option not included in a list of options in search results to be displayed on a display of a computing device; and causing the at least one alternative option not included in a list of options in search results to be displayed on the display of a computing device.

* * * * *